(12) United States Patent
Gallagher et al.

(10) Patent No.: US 8,087,977 B2
(45) Date of Patent: Jan. 3, 2012

(54) ANGLE GRINDER

(75) Inventors: William F. Gallagher, Stewartstown, PA (US); Michael C. Doyle, Baldwin, MD (US); Eric E. Hatfield, Jacobus, PA (US); David C. Tomayko, Ellicott City, MD (US); Daniel L. Krout, Abingdon, MD (US); Tanika Malloy, Nottingham, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/409,904

(22) Filed: Apr. 24, 2006

(65) Prior Publication Data

US 2006/0276114 A1 Dec. 7, 2006

Related U.S. Application Data

(60) Provisional application No. 60/680,621, filed on May 13, 2005.

(51) Int. Cl.
*B24B 27/08* (2006.01)
*B24B 55/04* (2006.01)
*H02K 9/00* (2006.01)
*H02K 7/14* (2006.01)

(52) U.S. Cl. .. 451/359; 310/62; 417/423.8; 417/423.14; 451/456; 451/488

(58) Field of Classification Search .......... 451/11, 451/344, 353, 355, 359, 354, 357, 358, 451, 451/456, 488; 310/58, 62, 63, 89; 417/423.8, 417/423.14

See application file for complete search history.

(56) References Cited

U.S. PATENT DOCUMENTS

| 394,417 A | | 12/1888 | Van Depoele | |
|---|---|---|---|---|
| 731,740 A | | 6/1903 | Bassett | |
| 1,971,790 A | * | 8/1934 | Mall | 451/359 |
| 2,079,143 A | * | 5/1937 | Albertson | 310/62 |

(Continued)

FOREIGN PATENT DOCUMENTS

DE 118 339 3/1900

(Continued)

OTHER PUBLICATIONS

Kress Elektrowerkzeuge Brochure, Program 2002/2003, p. 21.

*Primary Examiner* — Timothy V Eley

(74) *Attorney, Agent, or Firm* — Kofi Schulterbrandt; Scott B. Markow; Adan Ayala

(57) ABSTRACT

An angle grinder is provided including a trigger assembly for selectively actuating the angle grinder. A particle separation assembly is provided for the removal of any dust, particle, or artifacts that may have entered into the housing of the angle grinder. A brush biasing system is also provided to ensure proper and efficient operation of the motor of the angle grinder. An overload monitoring system is included to monitor the loading on the motor. A clutch mechanism is also included to prevent overloading on the motor of the angle grinder. A gear wheel lock mechanism is also provided to prevent the wheel spindle from rotating during installation or removal of a grinding wheel on the wheel spindle. An anti-locking flange system is also included to prevent the over-tightening of the flanges and the grinder wheel during the operation of the angle grinder. A gear case labyrinth feature is also provided.

18 Claims, 41 Drawing Sheets

U.S. PATENT DOCUMENTS

| | | | |
|---|---|---|---|
| 2,192,845 A | 3/1940 | Bean | |
| 2,201,420 A * | 5/1940 | Zschau | 451/353 |
| 2,348,341 A | 5/1944 | Gough | |
| 2,905,266 A * | 9/1959 | Poch | 55/418 |
| 2,987,636 A | 6/1961 | Jepson | |
| 3,077,340 A | 2/1963 | Jepson et al. | |
| 3,266,535 A * | 8/1966 | Brodie | 30/390 |
| 3,305,281 A * | 2/1967 | Dumpis | 384/151 |
| 3,325,948 A * | 6/1967 | Gronke | 451/355 |
| 3,474,575 A * | 10/1969 | Beckering et al. | 451/355 |
| 3,530,337 A | 9/1970 | Moore | |
| 3,535,829 A * | 10/1970 | Dudek | 451/355 |
| 3,681,635 A | 8/1972 | Bayer | |
| 3,731,556 A | 5/1973 | Decker | |
| 3,760,570 A | 9/1973 | Ehrlich et al. | |
| 3,797,336 A | 3/1974 | Howe | |
| 3,817,115 A | 6/1974 | Schnizler et al. | |
| 3,824,745 A | 7/1974 | Hutchins | |
| 3,847,233 A | 11/1974 | Glover et al. | |
| 3,854,020 A | 12/1974 | Summa et al. | |
| 3,866,493 A * | 2/1975 | Ringerud | 81/57.11 |
| 3,872,951 A | 3/1975 | Hastings, Jr. | |
| 3,873,796 A | 3/1975 | Worobec, Jr. et al. | |
| 3,899,852 A | 8/1975 | Batson | |
| 3,961,433 A | 6/1976 | D'Cruz et al. | |
| 3,999,176 A | 12/1976 | Kellogg et al. | |
| 4,007,401 A | 2/1977 | Kimmel et al. | |
| 4,020,359 A | 4/1977 | Tate et al. | |
| 4,137,749 A | 2/1979 | Friedrich | |
| 4,145,848 A | 3/1979 | Hutchins | |
| 4,157,483 A | 6/1979 | Frimley | |
| 4,186,288 A | 1/1980 | Overton et al. | |
| 4,205,732 A * | 6/1980 | Auerbach et al. | 181/230 |
| 4,232,414 A | 11/1980 | Curtiss | |
| 4,250,587 A | 2/1981 | Beck, Jr. | |
| 4,278,371 A | 7/1981 | Meyer | |
| 4,280,026 A | 7/1981 | Alessio | |
| 4,295,295 A | 10/1981 | Brand et al. | |
| 4,334,332 A | 6/1982 | Downs | |
| 4,343,502 A * | 8/1982 | Nelson | 292/356 |
| 4,380,693 A | 4/1983 | Kuhlmann et al. | |
| 4,400,995 A | 8/1983 | Palm | |
| 4,428,120 A * | 1/1984 | Kobayashi et al. | 30/390 |
| 4,434,586 A | 3/1984 | Muller et al. | |
| 4,467,896 A | 8/1984 | Sauerwein et al. | |
| 4,476,602 A | 10/1984 | Hurn et al. | |
| 4,506,119 A | 3/1985 | Tanabe | |
| 4,536,670 A | 8/1985 | Mayer | |
| 4,595,851 A | 6/1986 | Houben et al. | |
| 4,604,538 A | 8/1986 | Merrill et al. | |
| 4,658,321 A | 4/1987 | Lindner | |
| 4,729,252 A | 3/1988 | Huber et al. | |
| 4,735,020 A | 4/1988 | Schulz et al. | |
| 4,742,257 A * | 5/1988 | Carpenter | 310/62 |
| 4,765,099 A | 8/1988 | Tanner | |
| 4,770,316 A | 9/1988 | Overy | |
| 4,779,382 A | 10/1988 | Rudolf et al. | |
| 4,791,331 A | 12/1988 | Girardin | |
| 4,876,797 A * | 10/1989 | Zapata | 30/388 |
| 4,905,420 A | 3/1990 | Flachenecker et al. | |
| 4,932,163 A | 6/1990 | Chilton et al. | |
| 4,955,744 A | 9/1990 | Barth et al. | |
| 4,967,516 A | 11/1990 | Hoshino et al. | |
| 4,976,071 A | 12/1990 | Stabler | |
| 4,989,374 A | 2/1991 | Rudolf et al. | |
| 5,015,896 A | 5/1991 | Wong | |
| 5,022,188 A | 6/1991 | Borst | |
| 5,028,826 A | 7/1991 | Kitamura | |
| 5,038,523 A | 8/1991 | Farber et al. | |
| 5,051,552 A | 9/1991 | Hou et al. | |
| 5,058,909 A * | 10/1991 | Rudolf et al. | 279/8 |
| 5,077,942 A * | 1/1992 | Jacobsson | 451/344 |
| 5,100,275 A | 3/1992 | Schirrmacher | |
| 5,105,130 A | 4/1992 | Barker et al. | |
| 5,114,317 A | 5/1992 | Cohen | |
| 5,114,351 A | 5/1992 | Hoffmann | |
| 5,157,873 A | 10/1992 | Rudolf et al. | |
| 5,161,334 A | 11/1992 | Schaal et al. | |
| 5,170,851 A * | 12/1992 | Kress et al. | 173/29 |
| 5,184,039 A | 2/1993 | Kraft | |
| 5,207,028 A | 5/1993 | Timmons et al. | |
| 5,218,790 A | 6/1993 | Huang | |
| 5,227,950 A | 7/1993 | Twerdochlib | |
| 5,263,283 A | 11/1993 | Rudolf et al. | |
| 5,293,156 A | 3/1994 | Shoji et al. | |
| 5,315,193 A | 5/1994 | Kummer et al. | |
| 5,317,838 A * | 6/1994 | Bourner | 451/294 |
| 5,357,179 A * | 10/1994 | Abbagnaro et al. | 318/17 |
| 5,425,666 A | 6/1995 | Frank et al. | |
| 5,437,173 A | 8/1995 | Spinar | |
| 5,453,040 A | 9/1995 | Schaal et al. | |
| 5,464,365 A | 11/1995 | Kim | |
| 5,477,845 A * | 12/1995 | Zuzelo | 125/15 |
| 5,494,368 A | 2/1996 | Matthews | |
| 5,542,380 A | 8/1996 | Chatten | |
| 5,545,078 A | 8/1996 | Schulz et al. | |
| 5,558,210 A | 9/1996 | Jonischus | |
| 5,558,571 A | 9/1996 | Toyoshima et al. | |
| 5,563,461 A | 10/1996 | Daniels | |
| 5,564,969 A * | 10/1996 | Tsang | 451/358 |
| 5,580,302 A * | 12/1996 | Howard et al. | 451/357 |
| 5,584,753 A | 12/1996 | Takahashi | |
| 5,601,483 A | 2/1997 | Rudolf et al. | |
| 5,634,274 A * | 6/1997 | Ohkouchi et al. | 30/124 |
| 5,637,035 A | 6/1997 | Yee | |
| 5,667,347 A | 9/1997 | Matthews | |
| 5,679,066 A | 10/1997 | Butz et al. | |
| 5,707,275 A | 1/1998 | Preis et al. | |
| 5,718,621 A * | 2/1998 | Turley | 451/342 |
| 5,780,952 A | 7/1998 | Lau | |
| 5,793,141 A | 8/1998 | Simonsen et al. | |
| 5,819,871 A | 10/1998 | Takaoka | |
| 5,839,950 A | 11/1998 | Johansson et al. | |
| 5,947,805 A | 9/1999 | Van Osenbruggen | |
| 5,979,000 A | 11/1999 | Gansow | |
| 6,031,194 A | 2/2000 | Aoki | |
| 6,031,313 A | 2/2000 | Sugai et al. | |
| 6,058,815 A | 5/2000 | Habermehl | |
| 6,087,754 A | 7/2000 | Berger | |
| 6,119,547 A | 9/2000 | Goransson et al. | |
| 6,120,362 A | 9/2000 | Etter et al. | |
| 6,139,411 A * | 10/2000 | Everts et al. | 451/359 |
| 6,159,085 A * | 12/2000 | Hara | 451/451 |
| 6,175,179 B1 | 1/2001 | Herve | |
| 6,236,177 B1 | 5/2001 | Zick et al. | |
| 6,241,594 B1 * | 6/2001 | Lepold | 451/359 |
| 6,244,943 B1 * | 6/2001 | Bohler et al. | 451/294 |
| 6,257,970 B1 | 7/2001 | Huber | |
| 6,277,013 B1 | 8/2001 | Sasaki et al. | |
| 6,296,427 B1 | 10/2001 | Potter et al. | |
| 6,367,618 B1 | 4/2002 | Szuba | |
| 6,386,961 B1 * | 5/2002 | Cureton | 451/358 |
| 6,415,875 B1 | 7/2002 | Meixner et al. | |
| 6,441,533 B1 | 8/2002 | Grosskopf et al. | |
| 6,454,639 B1 | 9/2002 | Huber | |
| 6,464,572 B2 * | 10/2002 | Jansson | 451/344 |
| D468,179 S | 1/2003 | Hayakawa et al. | |
| 6,511,369 B2 | 1/2003 | Chi | |
| 6,514,131 B1 * | 2/2003 | Reich et al. | 451/344 |
| 6,515,399 B1 | 2/2003 | Lauf et al. | |
| 6,527,630 B2 | 3/2003 | Mannsperger et al. | |
| 6,554,554 B1 | 4/2003 | Matthews | |
| 6,569,001 B2 | 5/2003 | Rudolf et al. | |
| 6,585,834 B1 | 7/2003 | Kapaan et al. | |
| 6,595,196 B2 * | 7/2003 | Bath | 125/13.01 |
| 6,598,724 B1 * | 7/2003 | Stedman et al. | 192/217 |
| 6,602,122 B1 * | 8/2003 | Rudolf et al. | 451/344 |
| D479,452 S | 9/2003 | Cho | |
| D479,969 S | 9/2003 | Robson et al. | |
| 6,669,542 B1 | 12/2003 | Walz et al. | |
| 6,702,473 B2 | 3/2004 | Kahlman et al. | |
| 6,715,380 B2 | 4/2004 | Listl et al. | |
| 6,734,584 B1 * | 5/2004 | Browne et al. | 310/58 |
| D491,033 S | 6/2004 | Bian | |
| 6,742,601 B2 | 6/2004 | Numata | |
| 6,896,604 B1 * | 5/2005 | Taylor et al. | 451/451 |
| 6,910,694 B2 * | 6/2005 | Hartmann et al. | 279/141 |

| | | | |
|---|---|---|---|
| 7,204,744 B2 * | 4/2007 | Lamprecht et al. ............ 451/357 |
| 7,238,021 B1 * | 7/2007 | Johnson ............................ 433/1 |
| 7,252,581 B2 * | 8/2007 | Numata et al. ................. 451/359 |
| 7,270,641 B2 * | 9/2007 | Glucksman et al. ........... 601/112 |
| 7,428,881 B2 * | 9/2008 | Drelinger ....................... 119/610 |
| 7,541,701 B2 * | 6/2009 | Lin et al. ......................... 310/58 |
| 2001/0008098 A1 * | 7/2001 | Dibbern et al. .............. 83/471.3 |
| 2002/0045415 A1 * | 4/2002 | Bath ............................. 451/449 |
| 2002/0056338 A1 | 5/2002 | Olausson et al. |
| 2002/0090885 A1 | 7/2002 | Wendt |
| 2002/0163280 A1 | 11/2002 | Nakajima et al. |
| 2002/0170408 A1 * | 11/2002 | Hartmann et al. ............... 83/666 |
| 2003/0000716 A1 | 1/2003 | Hofmann et al. |
| 2003/0000717 A1 * | 1/2003 | Hofmann et al. ............. 173/216 |
| 2003/0136010 A1 | 7/2003 | Childs et al. |
| 2003/0147719 A1 | 8/2003 | Manfred |
| 2003/0190877 A1 * | 10/2003 | Gallagher et al. ............. 451/344 |
| 2004/0069513 A1 | 4/2004 | Wolf et al. |
| 2005/0146206 A1 * | 7/2005 | Moreau et al. ............. 301/124.1 |
| 2005/0152759 A1 * | 7/2005 | Allemann et al. ............ 409/181 |
| 2005/0153636 A1 * | 7/2005 | Numata et al. ................ 451/358 |
| 2005/0200087 A1 * | 9/2005 | Vasudeva et al. ............. 279/143 |

FOREIGN PATENT DOCUMENTS

| | | |
|---|---|---|
| DE | 122 029 | 11/1900 |
| DE | 123 407 | 2/1901 |
| DE | 131 551 | 5/1901 |
| DE | 155 280 | 12/1903 |
| DE | 178 451 | 2/1906 |
| DE | 225 343 | 3/1909 |
| DE | 39 22 514 A1 | 1/1917 |
| DE | 311 993 | 3/1918 |
| DE | 341 238 | 9/1919 |
| DE | 429619 | 8/1920 |
| DE | 482 136 | 8/1929 |
| DE | 736 475 | 6/1943 |
| DE | 881 831 C | 10/1952 |
| DE | 923 803 | 6/1954 |
| DE | 944 976 | 1/1956 |
| DE | 1 719 274 | 3/1956 |
| DE | 1 006 950 | 4/1957 |
| DE | 1 007 870 | 5/1957 |
| DE | 1 030 443 | 5/1958 |
| DE | 1 046 169 | 12/1958 |
| DE | 1 073 606 | 1/1960 |
| DE | 1 110 740 | 7/1961 |
| DE | 1 843 271 | 12/1961 |
| DE | 1 867 318 | 2/1963 |
| DE | 1 154 863 | 9/1963 |
| DE | 1 195 859 | 7/1965 |
| DE | 1 929 390 | 12/1965 |
| DE | 1 932 292 | 2/1966 |
| DE | 1 952 876 | 1/1967 |
| DE | 70 31 833 U | 4/1971 |
| DE | P 20 37 993.5 | 5/1971 |
| DE | 1 763 401 A | 8/1971 |
| DE | 1763649 | 11/1971 |
| DE | 20 39 793 | 2/1972 |
| DE | P 21 47 927.6 | 3/1973 |
| DE | 21 56 770 | 5/1973 |
| DE | P 21 58 598.8 | 6/1973 |
| DE | 2201297 | 7/1973 |
| DE | P 23 16 323 | 10/1974 |
| DE | 77 09 148 | 7/1977 |
| DE | 26 26 003 C2 | 12/1977 |
| DE | 26 44 118 A1 | 2/1978 |
| DE | 78 02 306 | 5/1978 |
| DE | 28 50 120 C2 | 5/1979 |
| DE | 29 19 669 | 5/1979 |
| DE | 2850120 | 5/1979 |
| DE | 28 43 712 | 7/1979 |
| DE | 77 28 401 | 7/1979 |
| DE | 80 16 761.9 | 5/1980 |
| DE | 29 27 331 | 2/1981 |
| DE | 3001907 | 7/1981 |
| DE | 30 23 691 C2 | 1/1982 |
| DE | 30 31 915 A1 | 4/1982 |
| DE | 31 10 912 A1 | 9/1982 |
| DE | 82 14 078 | 10/1982 |
| DE | 31 18 831 A1 | 1/1983 |
| DE | 32 34 254 A1 | 4/1983 |
| DE | 32 36 713 C2 | 5/1983 |
| DE | 83 27 966 U1 | 1/1984 |
| DE | 33 29 632 | 2/1984 |
| DE | 33 30 110 C2 | 3/1984 |
| DE | 33 41 874 C1 | 7/1984 |
| DE | 33 17 425 A1 | 8/1984 |
| DE | 83 17 913.5 U1 | 11/1984 |
| DE | 84 27 601 U1 | 5/1985 |
| DE | 35 34 052 | 4/1986 |
| DE | 35 01 947 | 7/1986 |
| DE | 36 04 980 | 8/1986 |
| DE | 85 25 046 U1 | 8/1986 |
| DE | 35 12 365 C2 | 10/1986 |
| DE | 35 31 309 A1 | 3/1987 |
| DE | 86 32 779 U1 | 3/1987 |
| DE | 36 41 878 A1 | 6/1987 |
| DE | 35 46 394 A1 | 7/1987 |
| DE | 86 01 684 U1 | 7/1987 |
| DE | 87 05 640 | 10/1987 |
| DE | 36 38 952 C2 | 5/1988 |
| DE | 88 09 302 U1 | 12/1988 |
| DE | 37 22 629 C2 | 1/1989 |
| DE | 37 41 536 A1 | 6/1989 |
| DE | 88 11 964 U1 | 8/1989 |
| DE | 88 12 072 U1 | 8/1989 |
| DE | 38 28 954 C2 | 3/1990 |
| DE | 38 44 617 A1 | 3/1990 |
| DE | 89 05 006 U1 | 3/1990 |
| DE | 38 36 317 A1 | 4/1990 |
| DE | 89 10 426 U1 | 8/1990 |
| DE | 40 04 464 C2 | 1/1991 |
| DE | 40 08 161 C1 | 5/1991 |
| DE | 41 07 431 C2 | 9/1991 |
| DE | 41 02 014 | 10/1991 |
| DE | 91 04 028 U1 | 11/1991 |
| DE | G 91 16 586.5 | 11/1991 |
| DE | 41 05 340 C2 | 8/1992 |
| DE | 41 19 325 A1 | 12/1992 |
| DE | 41 19 941 A1 | 1/1993 |
| DE | 92 13 624 | 1/1993 |
| DE | 91 12 104 U1 | 3/1993 |
| DE | 91 16 586 | 8/1993 |
| DE | 92 08 940 | 12/1993 |
| DE | 43 34 358 A1 | 4/1994 |
| DE | 43 05 317 C2 | 9/1994 |
| DE | 43 06 009 C2 | 9/1994 |
| DE | 44 21 480 A1 | 3/1995 |
| DE | 43 37 023 A1 | 5/1995 |
| DE | 44 38 549 A1 | 5/1995 |
| DE | 43 41 931 A1 | 6/1995 |
| DE | 295 14 330 U1 | 12/1995 |
| DE | 44 24 427 C2 | 1/1996 |
| DE | 44 32 973 A1 | 3/1996 |
| DE | 296 05 144 U1 | 8/1996 |
| DE | 195 07 955 A1 | 9/1996 |
| DE | 195 10 291 C2 | 9/1996 |
| DE | 296 12 231 | 10/1996 |
| DE | 196 18 958 A1 | 1/1997 |
| DE | 195 30 542 A1 | 2/1997 |
| DE | 296 22 019 U1 | 5/1998 |
| DE | 196 50 224 A1 | 6/1998 |
| DE | 196 50 364 A1 | 6/1998 |
| DE | 297 02 947 U1 | 7/1998 |
| DE | 19800047 | 9/1998 |
| DE | 197 50 038 A1 | 5/1999 |
| DE | 198 07 439 A1 | 8/1999 |
| DE | 298 16 970 U1 | 2/2000 |
| DE | 198 60 396 A1 | 6/2000 |
| DE | 199 32 578 A1 | 6/2000 |
| DE | 199 04 728 A1 | 8/2000 |
| DE | 199 14 855 A1 | 10/2000 |
| DE | 100 35 219.7 | 1/2001 |
| DE | 299 23 577 | 1/2001 |
| DE | 19944564 | 3/2001 |
| DE | 100 50 367 A1 | 5/2001 |
| DE | 100 00 702 A1 | 7/2001 |
| DE | 100 30 586.5 | 1/2002 |

| | | | | | | |
|---|---|---|---|---|---|---|
| DE | 100 34 466 A1 | 1/2002 | | EP | 0 734 116 | 9/1996 |
| DE | 100 49 334 A1 | 2/2002 | | EP | 0 760 063 B1 | 3/1997 |
| DE | 101 30 063 A1 | 3/2002 | | EP | 0 780 031 | 6/1997 |
| DE | 100 59 975 A1 | 6/2002 | | EP | 0 802 552 B1 | 10/1997 |
| DE | 102 09 097 A1 | 9/2002 | | EP | 0 806 268 B1 | 11/1997 |
| DE | 101 18 035 A1 | 11/2002 | | EP | 0 808 011 | 11/1997 |
| DE | 101 31 266 A1 | 1/2003 | | EP | 0 868 265 B1 | 10/1998 |
| DE | 101 61 452 A1 | 2/2003 | | EP | 0 942 802 B1 | 9/1999 |
| DE | 10161452 | 2/2003 | | EP | 1 008 229 B1 | 6/2000 |
| DE | 100 41 631 A1 | 3/2003 | | EP | 1 024 582 A2 | 8/2000 |
| DE | 101 31 220 | 3/2003 | | EP | 1 077 106 A2 | 2/2001 |
| DE | 102 38 533 A1 | 4/2003 | | EP | 1 132 180 A2 | 9/2001 |
| DE | 102 48 128 A1 | 4/2003 | | EP | 1 168 390 A1 | 1/2002 |
| DE | 101 61 615 A1 | 6/2003 | | EP | 1 173 869 B1 | 1/2002 |
| DE | 10161616 | 6/2003 | | EP | 1 174 537 A2 | 1/2002 |
| DE | 101 62 102.7 | 7/2003 | | EP | 1 293 296 A2 | 3/2002 |
| DE | 102 31 249 A1 | 2/2004 | | EP | 1 217 237 A1 | 6/2002 |
| DE | 102 48 924 A1 | 4/2004 | | EP | 1 260 322 A1 | 11/2002 |
| DE | 102 48 921 A1 | 5/2004 | | EP | 1 327 497 A2 | 7/2003 |
| EP | 0 010 979 | 5/1980 | | EP | 1 489 727 A1 | 6/2004 |
| EP | 0 042 655 A1 | 12/1981 | | EP | 1449618 | 8/2004 |
| EP | 0 043 460 | 1/1982 | | EP | 1470882 | 10/2004 |
| EP | 0 133 645 | 3/1985 | | FR | 1500685 | 11/1967 |
| EP | 0 174 382 B1 | 3/1986 | | FR | 2514550 A | 4/1983 |
| EP | 0 235 598 B1 | 9/1987 | | FR | 2 771 787 | 6/1999 |
| EP | 0 252 552 A1 | 1/1988 | | GB | 2018045 A | 10/1979 |
| EP | 0 334 864 | 6/1988 | | GB | 2 304 407 | 3/1997 |
| EP | 0298236 A | 1/1989 | | GB | 2 319 974 A | 6/1998 |
| EP | 0 301 269 B1 | 2/1989 | | GB | 2 390 562 A | 1/2004 |
| EP | 0 339 027 B1 | 11/1989 | | JP | SHO 60-152247 | 8/1985 |
| EP | 0 391 937 B1 | 10/1990 | | JP | HEI 3-230736 | 10/1991 |
| EP | 0 408 986 B1 | 1/1991 | | JP | 6238557 | 8/1994 |
| EP | 0 408 987 B1 | 1/1991 | | WO | WO 82/00353 | 2/1982 |
| EP | 0 412 439 A2 | 2/1991 | | WO | WO 92/04549 | 3/1992 |
| EP | 0 458 080 B1 | 4/1991 | | WO | WO 93/04835 | 3/1993 |
| EP | 0 458 190 B1 | 11/1991 | | WO | WO 94/07041 | 3/1994 |
| EP | 0 472 548 B1 | 3/1992 | | WO | WO 95/00288 | 1/1995 |
| EP | 0 548 169 | 3/1992 | | WO | WO 97/07347 | 2/1997 |
| EP | 0 501 839 A2 | 9/1992 | | WO | WO 98/01733 | 1/1998 |
| EP | 0 513 003 B1 | 11/1992 | | WO | WO 98/09096 | 3/1998 |
| EP | 0 515 230 B1 | 11/1992 | | WO | WO 99/56024 | 11/1999 |
| EP | 0 521 259 B1 | 1/1993 | | WO | WO 01/51251 A1 | 7/2001 |
| EP | 0 537 700 A1 | 4/1993 | | WO | WO 01/66314 | 9/2001 |
| EP | 0 542 693 A1 | 5/1993 | | WO | WO 02/08636 | 1/2002 |
| EP | 0 575 763 B1 | 12/1993 | | WO | WO 02/054972 | 7/2002 |
| EP | 0 591 875 | 4/1994 | | WO | WO 03/004217 A1 | 1/2003 |
| EP | 0 591 876 | 4/1994 | | WO | WO 03/004218 A1 | 1/2003 |
| EP | 0 604 477 B1 | 7/1994 | | WO | WO 03/095862 A1 | 11/2003 |
| EP | 0 650 805 B1 | 5/1995 | | WO | WO 2004/077646 A1 | 9/2004 |
| EP | 0 656 641 B1 | 6/1995 | | | | |
| EP | 0 691 181 B1 | 1/1996 | | | | |
| EP | 0 732 174 | 9/1996 | | | | |

\* cited by examiner

ANGLE GRINDER

CROSS REFERENCE TO RELATED APPLICATIONS

The present application claims benefit under 35 USC §119 (e) of U.S. provisional patent application Ser. No. 60/680,621 filed on May 13, 2005. The disclosure of the above applications are incorporated herein by reference.

FIELD OF THE INVENTION

The present invention generally relates to angle grinders.

BACKGROUND AND SUMMARY OF THE INVENTION

Angle grinding tools are commonly used for applications such as grinding and sanding. Angle grinders typically include a rotary shaft for driving a grinding wheel mounted thereon. The present application describes several improvements to angle grinders.

Further areas of applicability of the present invention will become apparent from the detailed description provided hereinafter. It should be understood that the detailed description and specific examples, while indicating the preferred embodiment of the invention, are intended for the purposes of illustration only and are not intended to limit the scope of the invention.

BRIEF DESCRIPTION OF THE DRAWINGS

The present invention will become more fully understood from the detailed description and the accompanying drawings wherein.

DETAILED DESCRIPTION OF THE PREFERRED EMBODIMENTS

Figure 1:
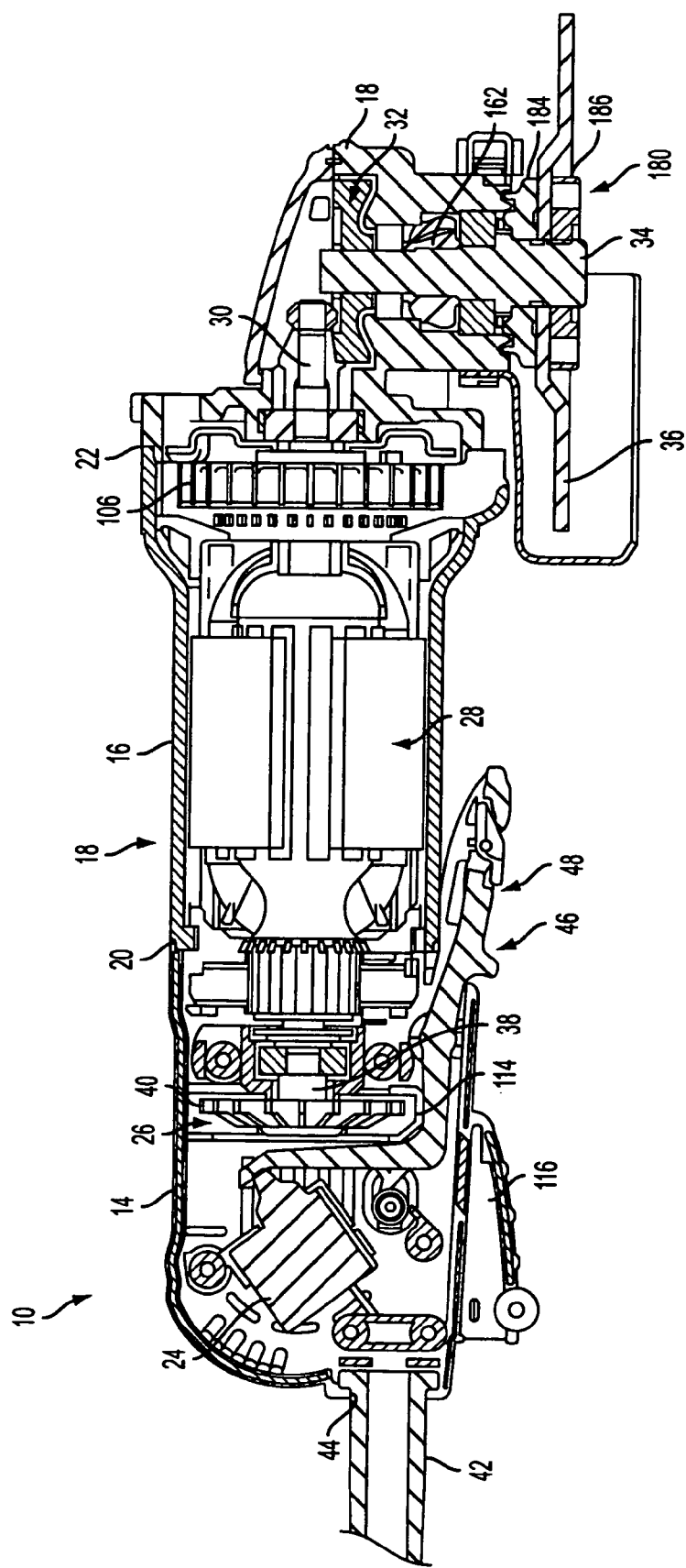
FIG. 1 is a side, cross-sectional view of an angle grinder having a paddle trigger according to the principles of the present invention.
Figure 2:
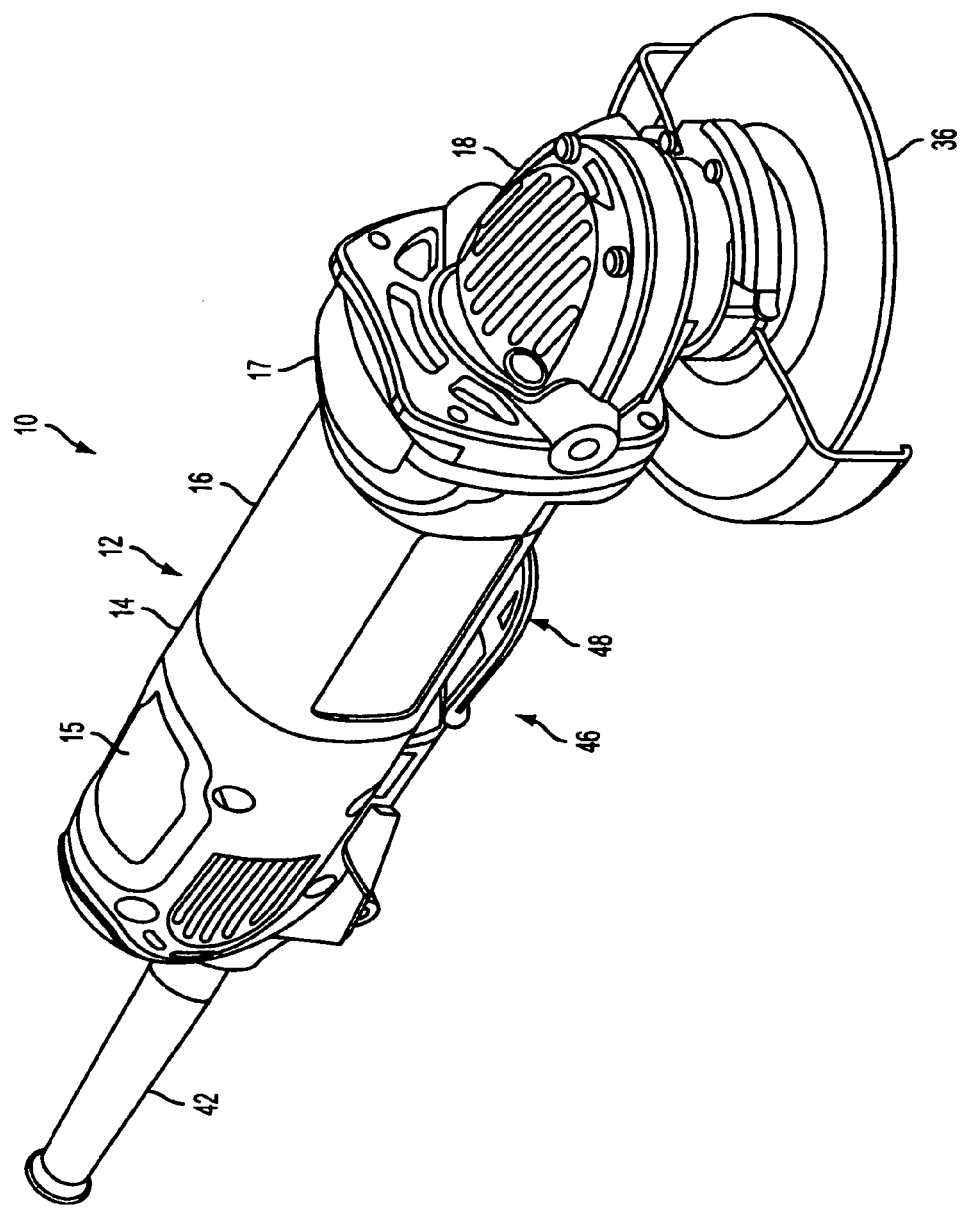
FIG. 2 is perspective view of the angle grinder having a paddle trigger.
Figure 3:
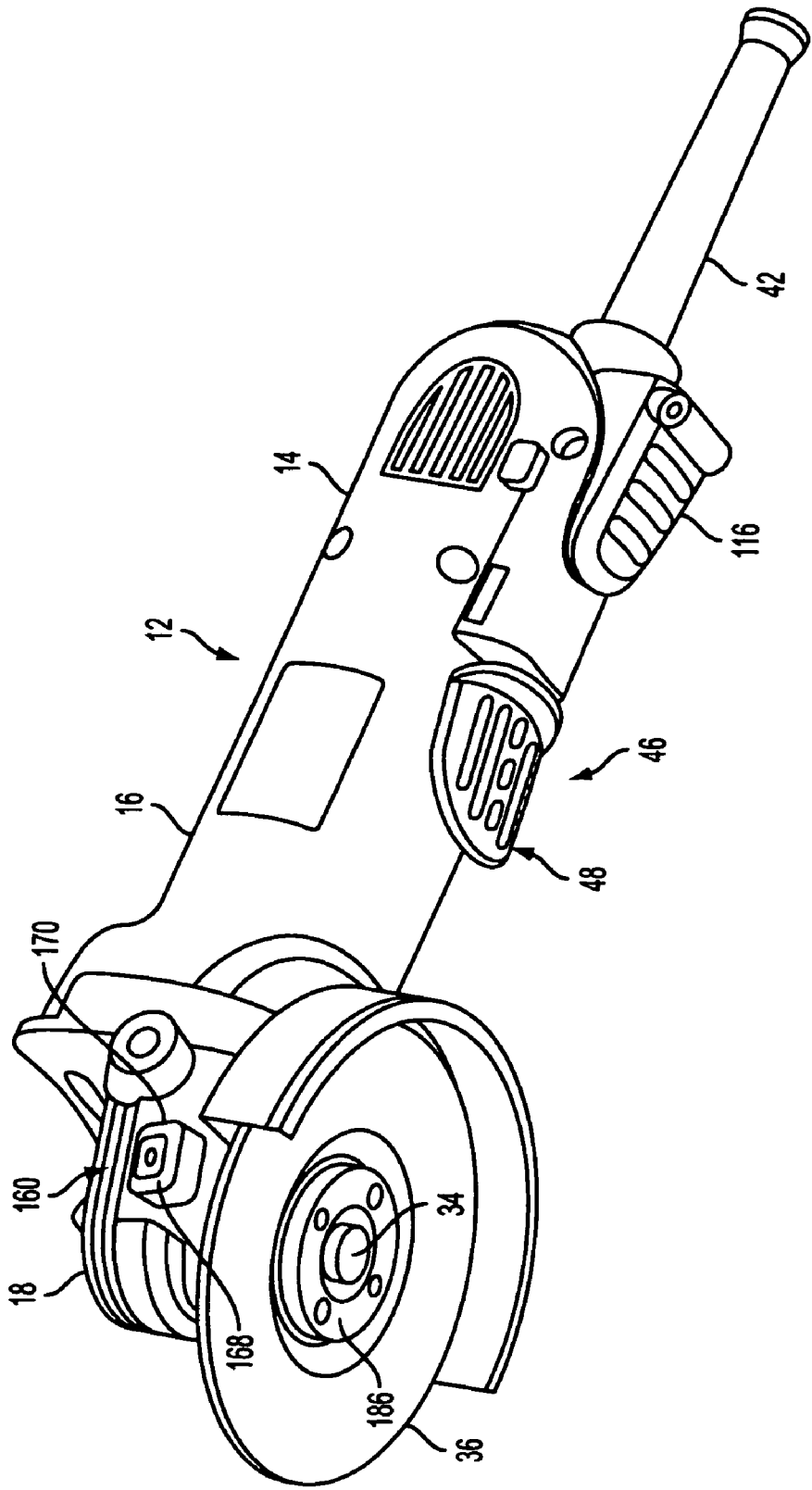
FIG. 3 is a bottom perspective view of the angle grinder having a paddle trigger.

With reference to FIGS. 1, 2, and 3, a preferred embodiment of an angle grinder 10 is shown. The preferred embodiments of the present invention describe various features of an angle grinder and it will be readily appreciated that the described features may be applied to any angle grinder known in the art, including large angle grinders (LAG), medium angle grinders (MAG), and small angle grinders (angle grinder). The angle grinder 10 preferably includes a housing 12 having a handle portion 14, a field case 16, and a gear case 18. The handle portion 14 is preferably fixedly attached to a first end 20 of the field case 16 and the gear case 18 is preferably fixedly attached to a second end 22 of the field case 16. The handle portion 14 preferably supports a switch 24 and associated components. The handle portion 14 also preferably supports a particle separation assembly 26. The field case 16 preferably supports a motor 28 having a motor spindle 30 that extends into the gear case 18 for driving gearset 32 supported therein. A wheel spindle 34 preferably extends from gear case 18 and is driven by the motor spindle 30 through the gearset 32. The axis of rotation of motor spindle 30 is generally perpendicular to the axis of rotation of the wheel spindle 34. A grinder wheel 36 is preferably selectively attachable to the wheel spindle 34 and is rotatably driven thereby. The motor 28 may also have a second spindle 38 that extends into the handle portion 14 for rotatably driving a fan 40, associated with the particle separation assembly 26.

The motor 28 preferably is in electrical communication with the switch 24 through wires (not shown). Preferably, the switch 24 is further in electrical communication with a power source via a cord 42 including a plug (not shown). The handle portion 14 preferably includes an opening 44, opposite the connection end, through which the cord 42 runs. A trigger 46 preferably is in mechanical communication with the switch 24 for selectively supplying power to the motor 28. Mechanical actuation of the trigger 46 preferably results in actuation of the switch 24 thereby resulting in operation the angle grinder 10.

Trigger—Paddle Switch

Figure 4:
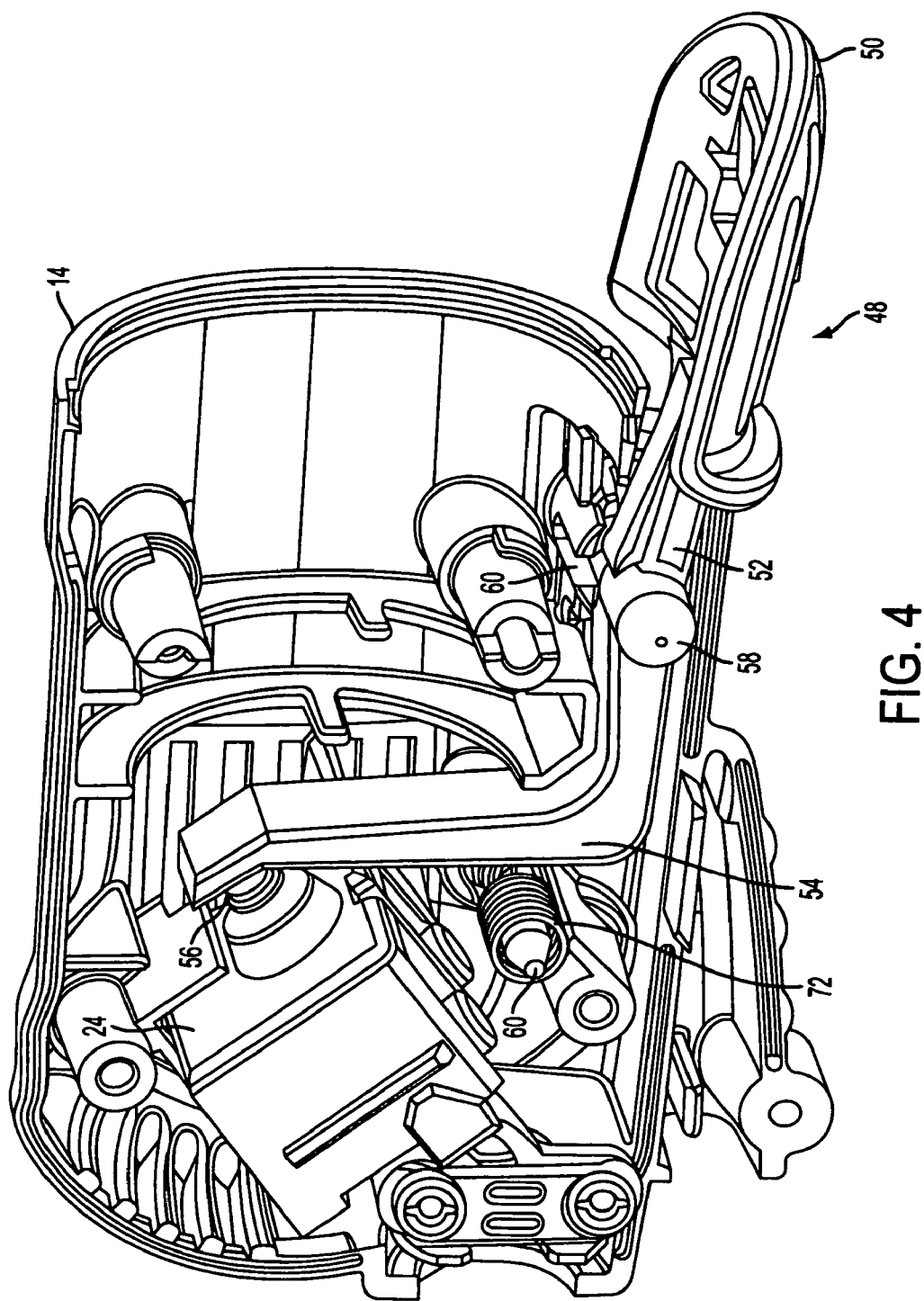
FIG. 4 is a perspective partial cross-sectional view of the handle portion detailing the paddle trigger.
Figure 5:
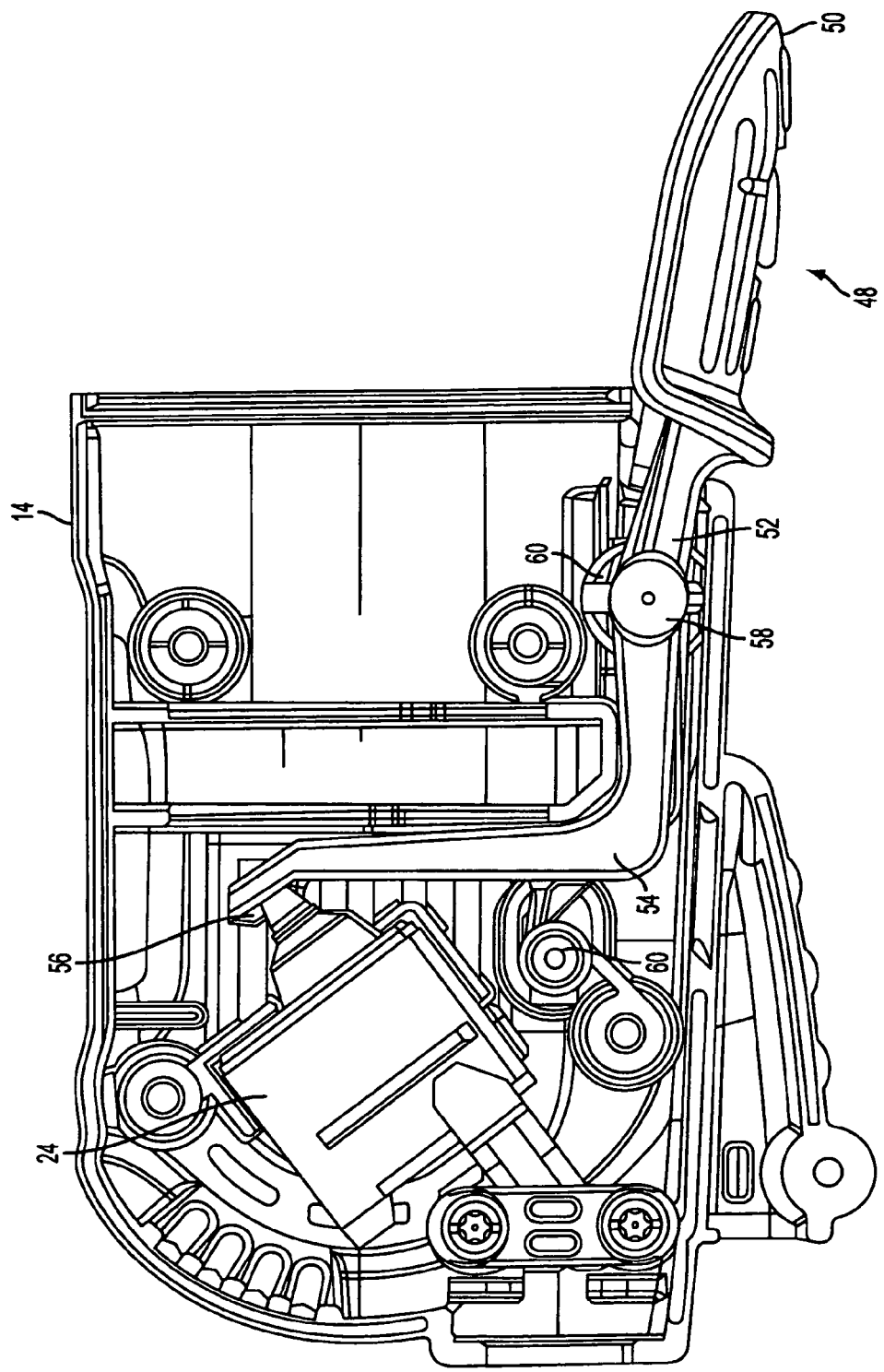
FIG. 5 is a side perspective partial cross-sectional view of the handle portion detailing the paddle trigger.

With reference to FIGS. 1 and 4-5, a paddle switch trigger system is detailed. The paddle trigger 48 preferably includes a paddle portion 50 with a first arm 52 extending therefrom. A second arm 54 preferably extends upward from and generally perpendicular to the first arm 52. A face 56 of the second arm 54 may be in contact with the switch 24 for selectively actuating the switch 24. Pivot posts 58 perpendicularly extend from either side of the first arm 52. Preferably, the pivot posts 58 are received into apertures 60 of the handle portion 14 for facilitating pivotal support of the paddle trigger 48.

Figure 6:
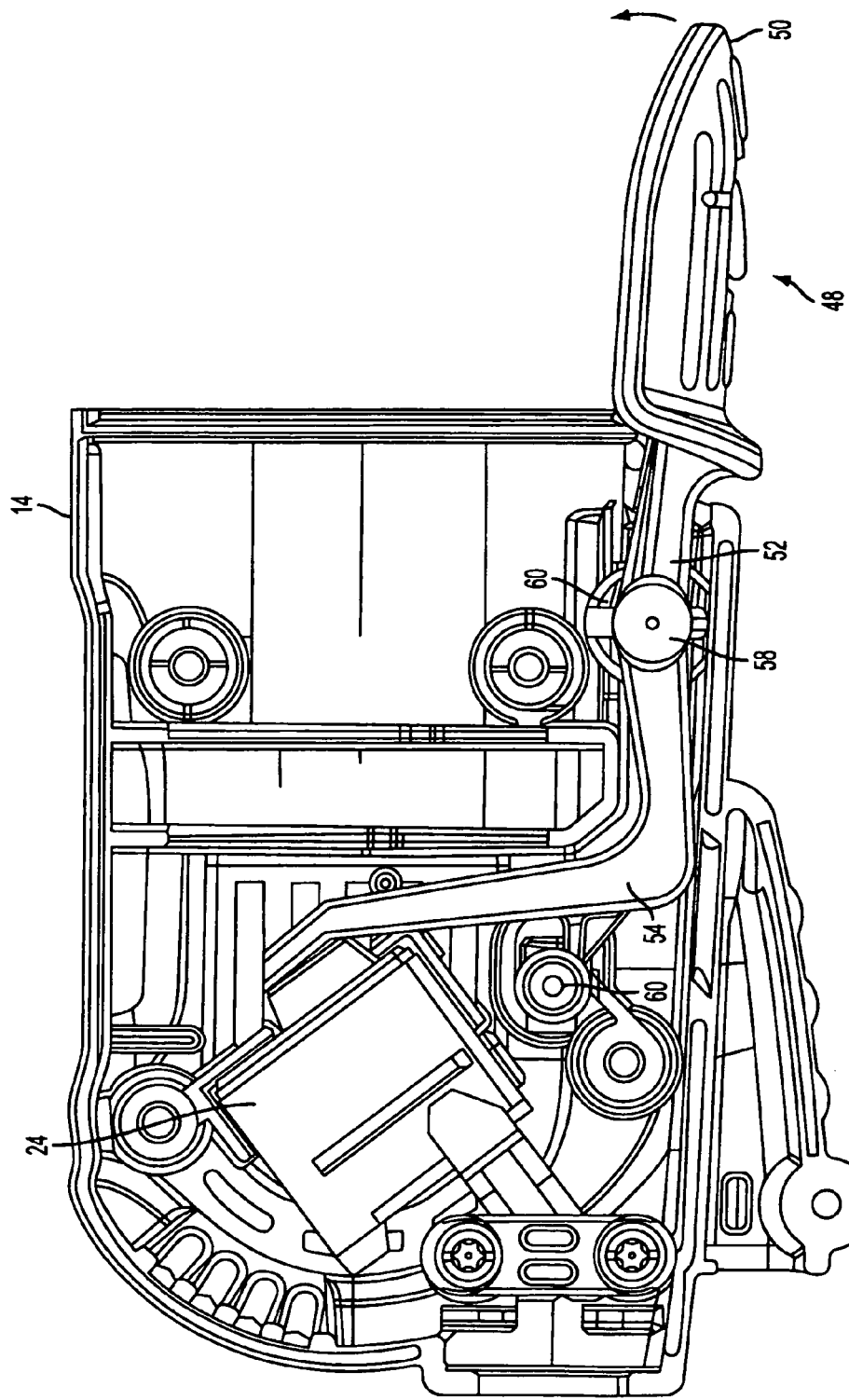
FIG. 6 is a side perspective partial cross-sectional view of the handle portion detailing the paddle trigger when actuated.

In a preferred embodiment, the paddle trigger 48 is biased to an OFF position as shown in FIGS. 4 and 5. Switch 24 preferably includes a biasing member such as a spring (not shown) to bias the paddle trigger 48 to the OFF position. As can be seen in FIG. 6, depression of the paddle portion 50 toward the handle portion 14 preferably pivots the paddle trigger 48, pivoting the first and second arms 52, 54. Second arm 54 pivots towards switch 24 operating the switch to ON, thus initiating operation of the angle grinder 10.

Figure 7:
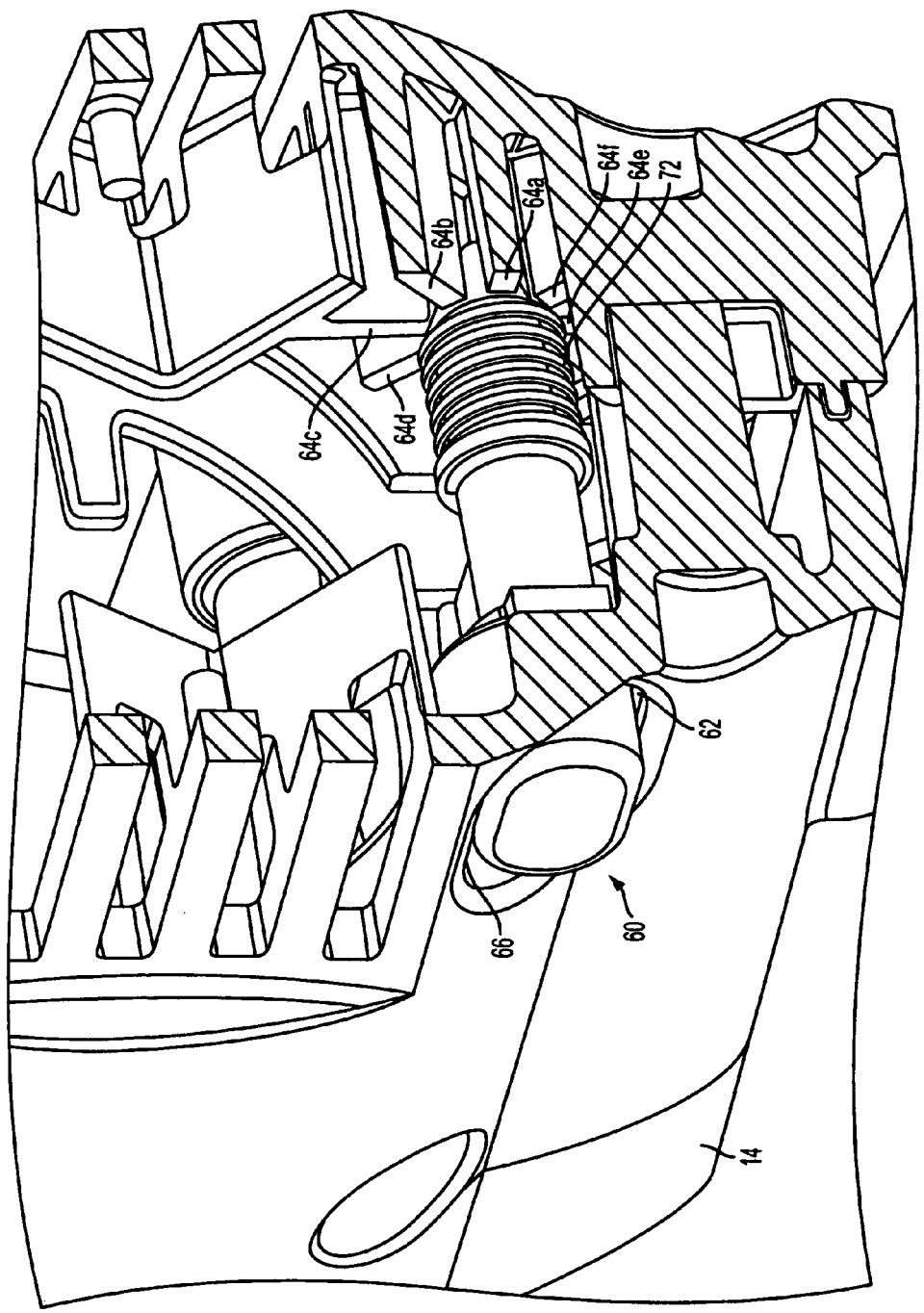
FIG. 7 is a perspective partial cross-sectional view of the handle portion detailing the paddle trigger locking member.

A locking member 60 may further be included and is used to engage the trigger paddle 48 locking the trigger paddle 48 in a depressed position, thereby keeping the angle grinder 10 continuously activated. As shown in FIG. 7, locking member 60 preferably is slideably supported within the handle portion 14. Locking member 60 is preferably supported by a plurality of housing surfaces 62, 64a-g, 66 on both ends thereby minimizing the degrees of freedom of movement for the locking member 60. By minimizing the degrees of freedom of movement, the locking member 60 is more securely supported in the handle portion 14 providing a stronger and more durable interface with the trigger paddle 48.

Figure 8:
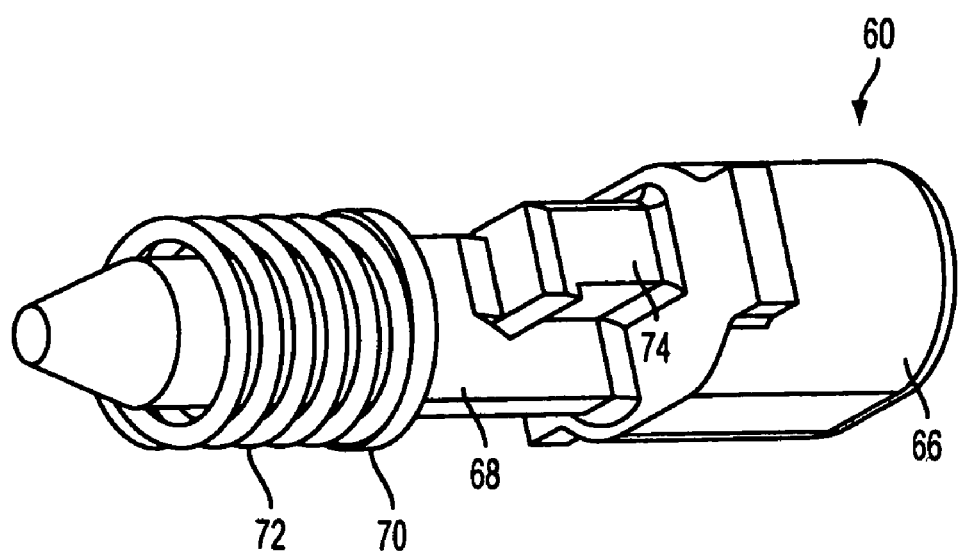
FIG. 8 is a perspective view of the locking member.
Figure 9:
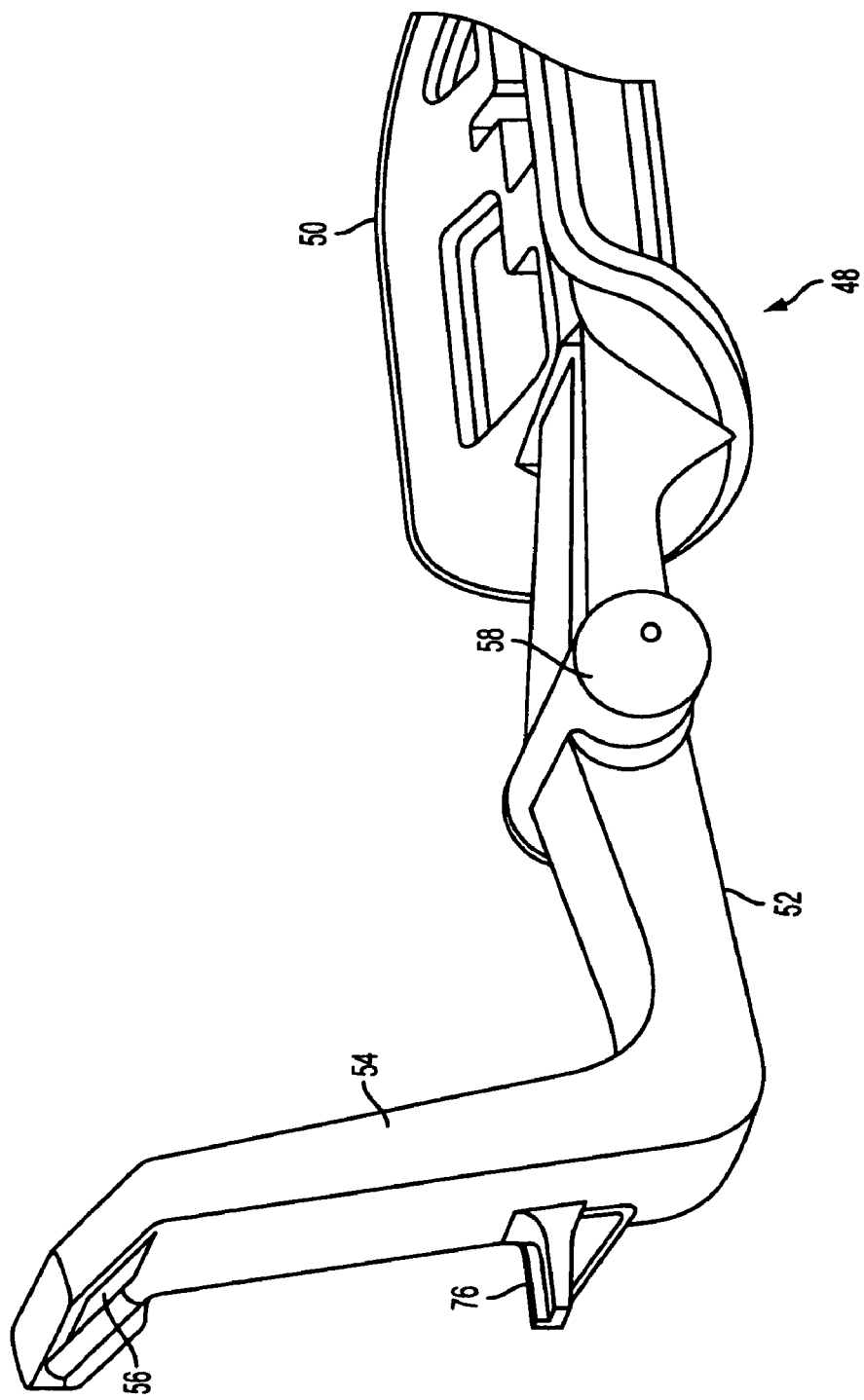
FIG. 9 is a perspective view of the paddle trigger detailing the locking member engagement bracket.

As can be seen in FIG. 8, the locking member 60 preferably has a head portion 66 for user interface and a body portion 68 which includes a collar 70 for abutment with a biasing member. A biasing member 72, such as a spring, is preferably included to bias the locking member 60 in an outwardly or unengaged position. The locking member 60 may also have a lock protrusion 74 designed to engage a bracket 76 (shown in FIG. 9) located on the second leg 54 of the trigger paddle 48.

Figure 10:
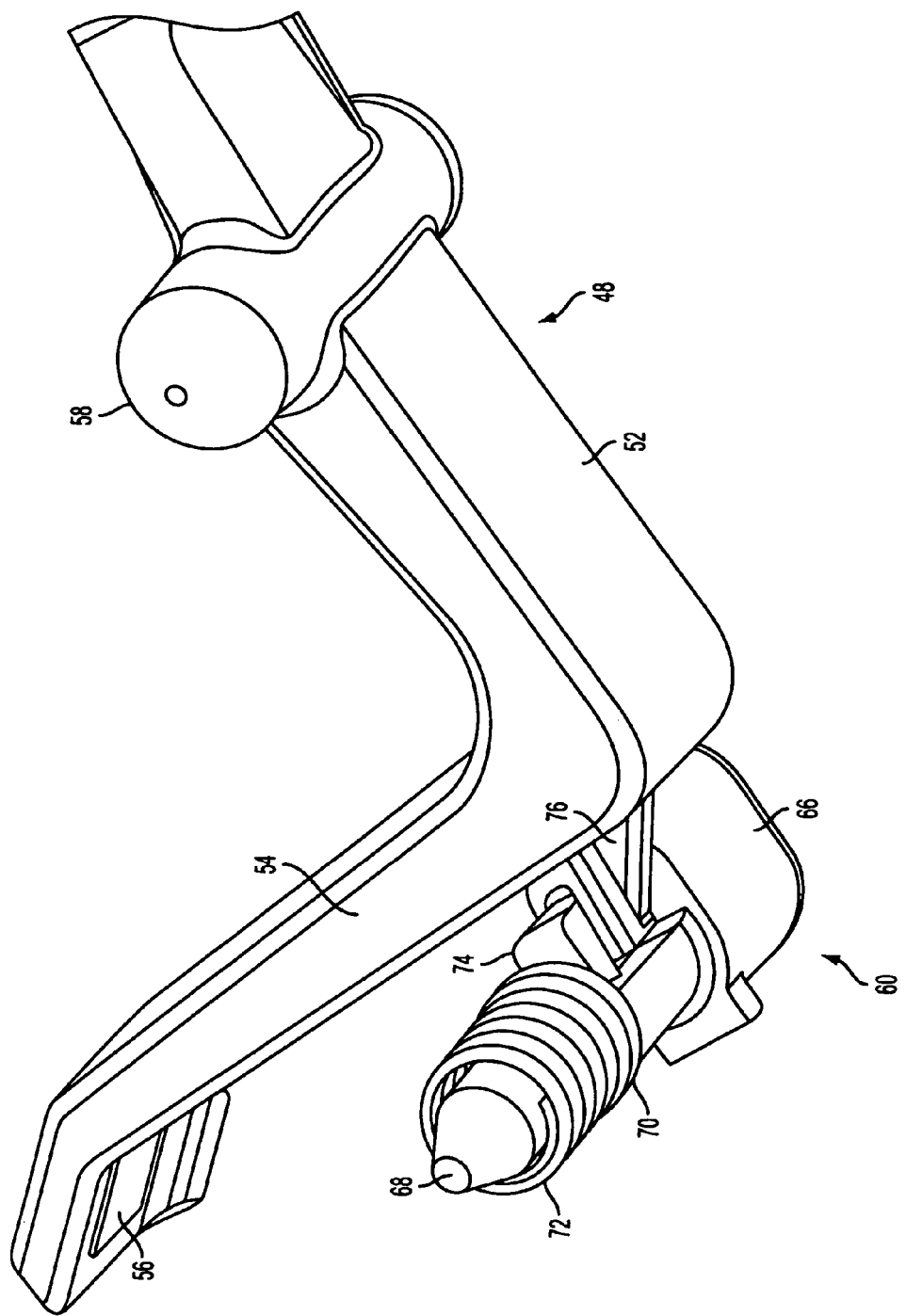
FIG. 10 is a bottom perspective view of the locking member and the paddle trigger when engaged.
Figure 11:
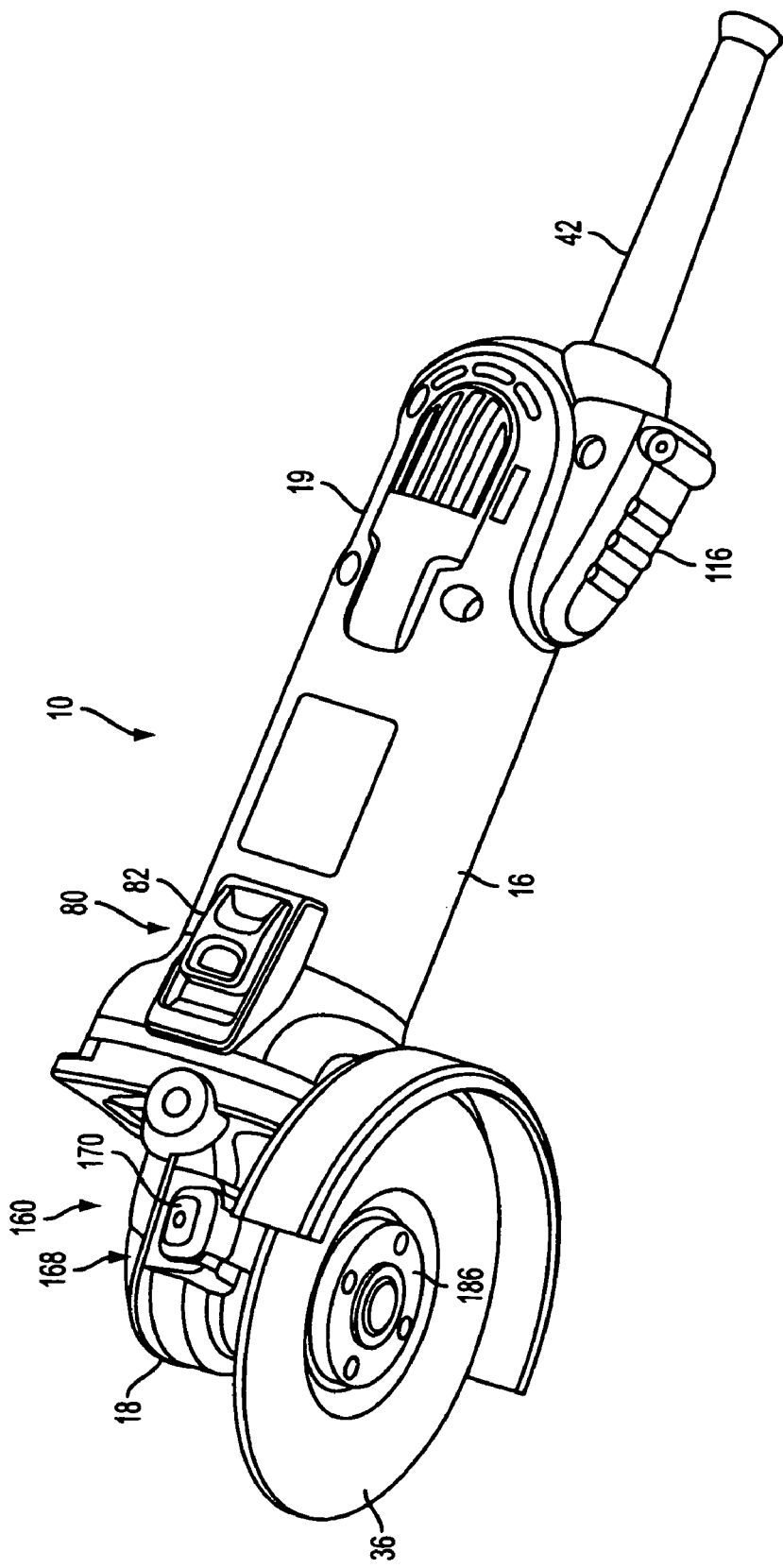
FIG. 11 is a bottom perspective view of an angle grinder having a slider button trigger.
Figure 12:
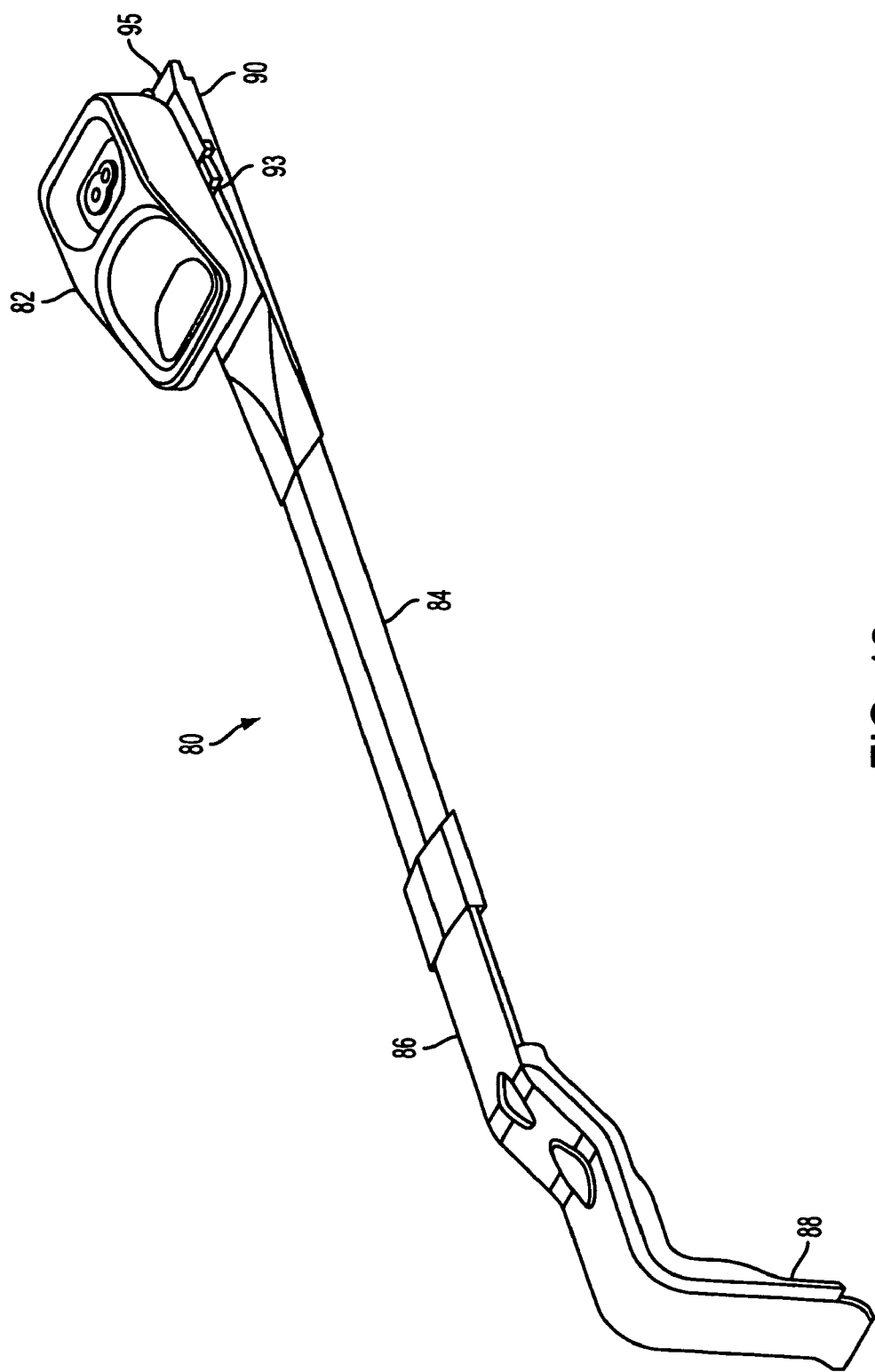
FIG. 12 is a perspective view of the slider button trigger.
Figure 13:
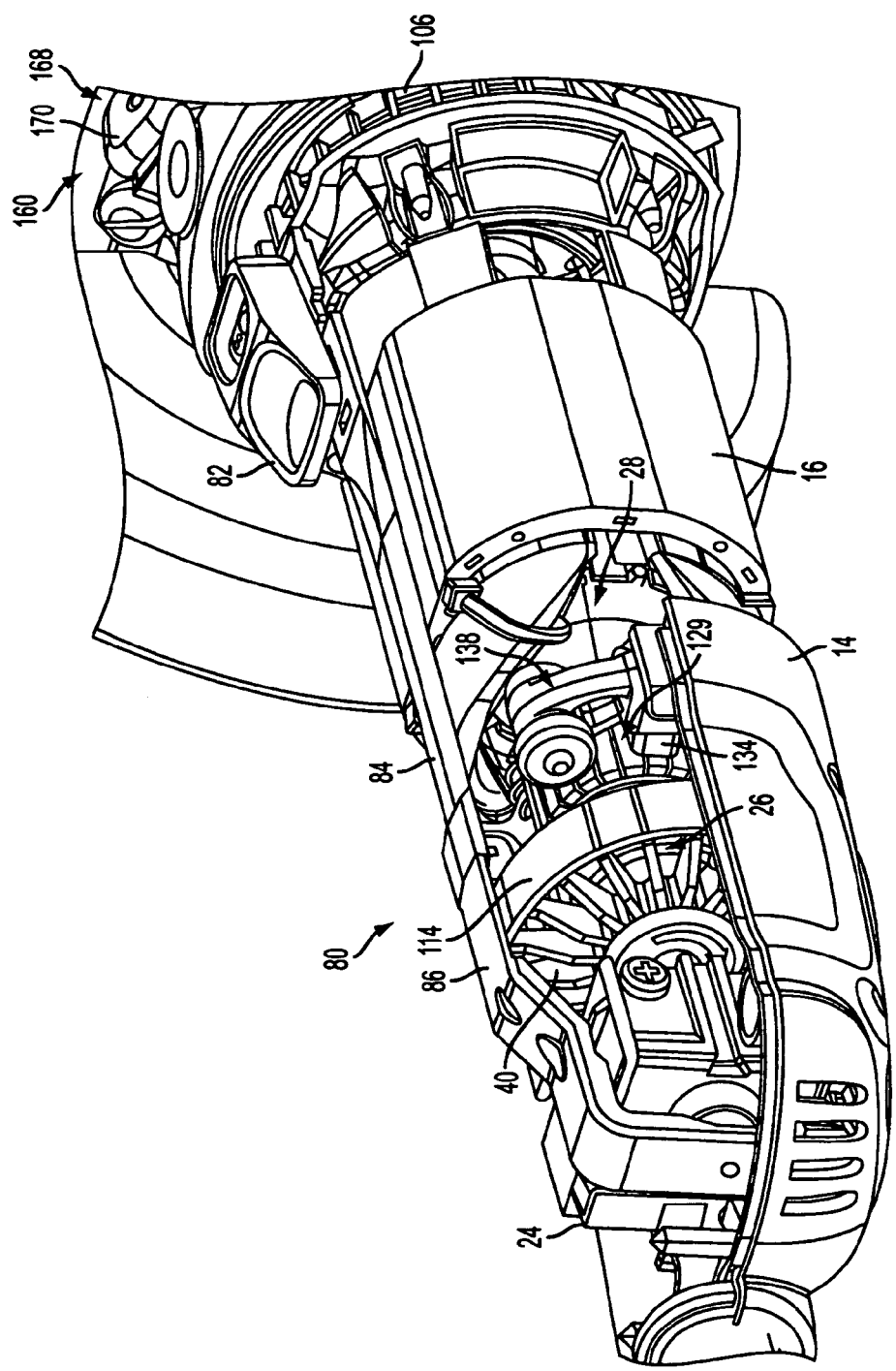
FIG. 13 is a perspective partial cross-sectional view of the angle grinder detailing the slider button trigger.

Turning to FIG. 10, the locking member 60 is shown engaging the trigger paddle 48. To engage the locking member 60 and the trigger paddle 48, a user preferably depresses the paddle trigger 48 towards handle portion 14 and pushes the locking member 60 inwardly engaging the lock protrusion 74 of the locking member 60 and the bracket 76 of the trigger paddle 48. In a preferred embodiment, because the locking member 60 is biased outwardly by the biasing member 72 and the trigger paddle 48 is biased away from the handle portion 14 by the biasing member in switch 24, the lock protrusion 74 and the bracket 76 do not disengage once engaged. To disengage the locking member 60 and the trigger paddle 48, the user preferably further depresses the trigger paddle 48 toward the handle portion 14 disengaging the lock protrusion 74 from the bracket 76 thereby disengaging locking member 60 and trigger paddle 48. In a preferred embodiment, the biasing force of the biasing member 72 returns the locking member 60 to its unengaged position and the biasing force from the biasing member of the switch 24 returns the trigger paddle 48 back to the OFF position.

Trigger—Slider Button

With reference to FIGS. 11 through 13, 15 and 17, an alternative slider button trigger system is detailed. The slider button trigger 80 preferably includes a slider button 82 attached to a first link member 84 via posts 90. In a preferred embodiment, a second link member 86 is fixedly attached to the first link member 84, however, in an alternate embodiment, there may only be one link member. A face 88 of the second link member 86 may be in contact with the switch 24 for selectively actuating the switch 24. Posts 90 preferably extend from the under side of the slider button 82 through an aperture 94 of an engagement member 92 of the field case 16 for sliding movement of the slider button trigger 80. The engagement member 92 is preferably fixedly attached to the field case 16 of angle grinder 10 and has a first end 93 and second end 95. In a preferred embodiment, the engagement member 92 is formed from metal.

Figure 14:
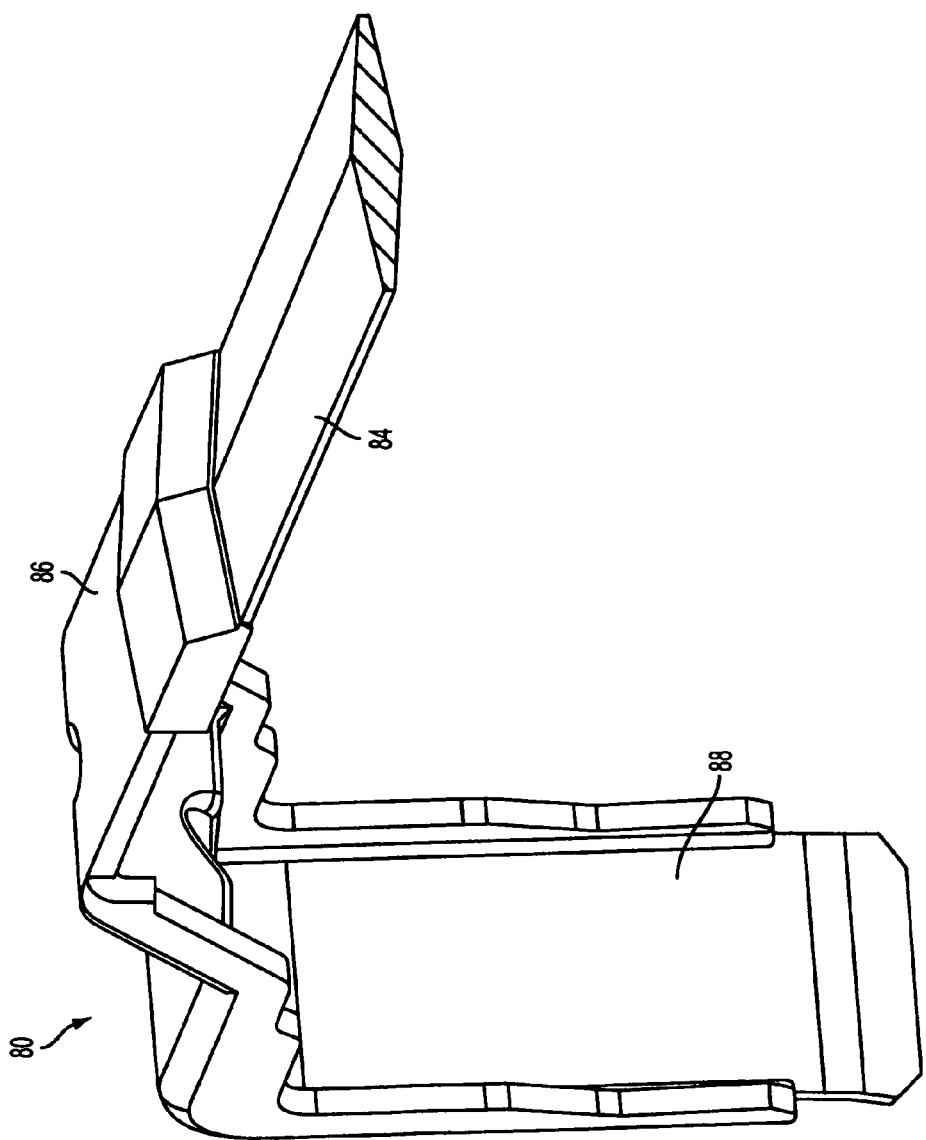
FIG. 14 is a perspective partial cross-sectional view of a rear portion of the slider button trigger.

Referring to FIG. 14, in a preferred embodiment, the first link member 84 of the slider button trigger 80 has a generally diamond-shaped profile. This shape assists in preventing jamming of the sliding movement of slider button trigger 80 resulting from the presence of artifacts, particles, or dust that may have entered into the housing 12 of the angle grinder 10. With continued reference to FIG. 14 and with reference to FIG. 12, the second link member 86, in a preferred embodiment, is formed from metal to reduce any deformation of shape of the second link member 86 and to further reduce any jamming of the sliding movement of the slider button trigger 80 resulting from the presence of artifacts, particles, or dust that may have entered into the housing 12 of the angle grinder 10.

Figure 15:
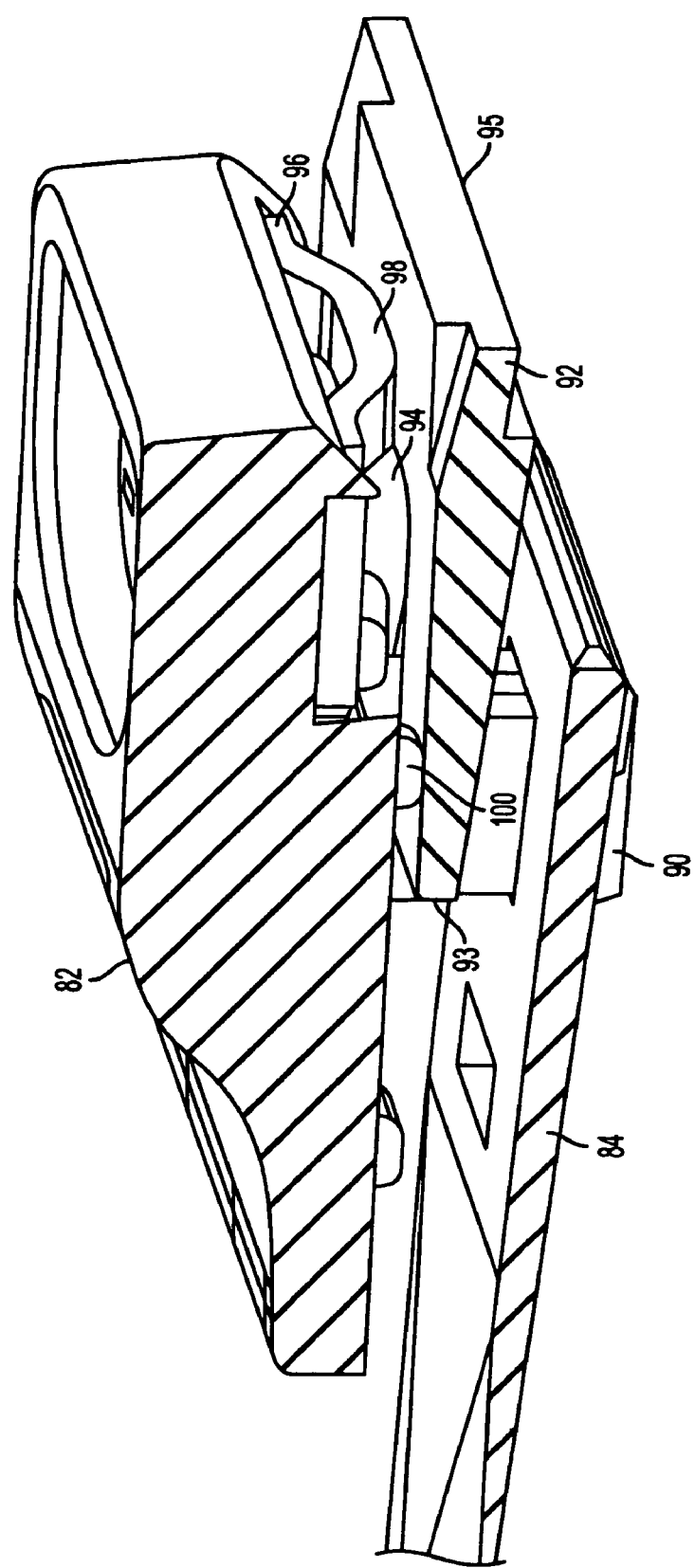
FIG. 15 is a perspective partial cross-sectional view of a front portion of the slider button trigger.
Figure 16:
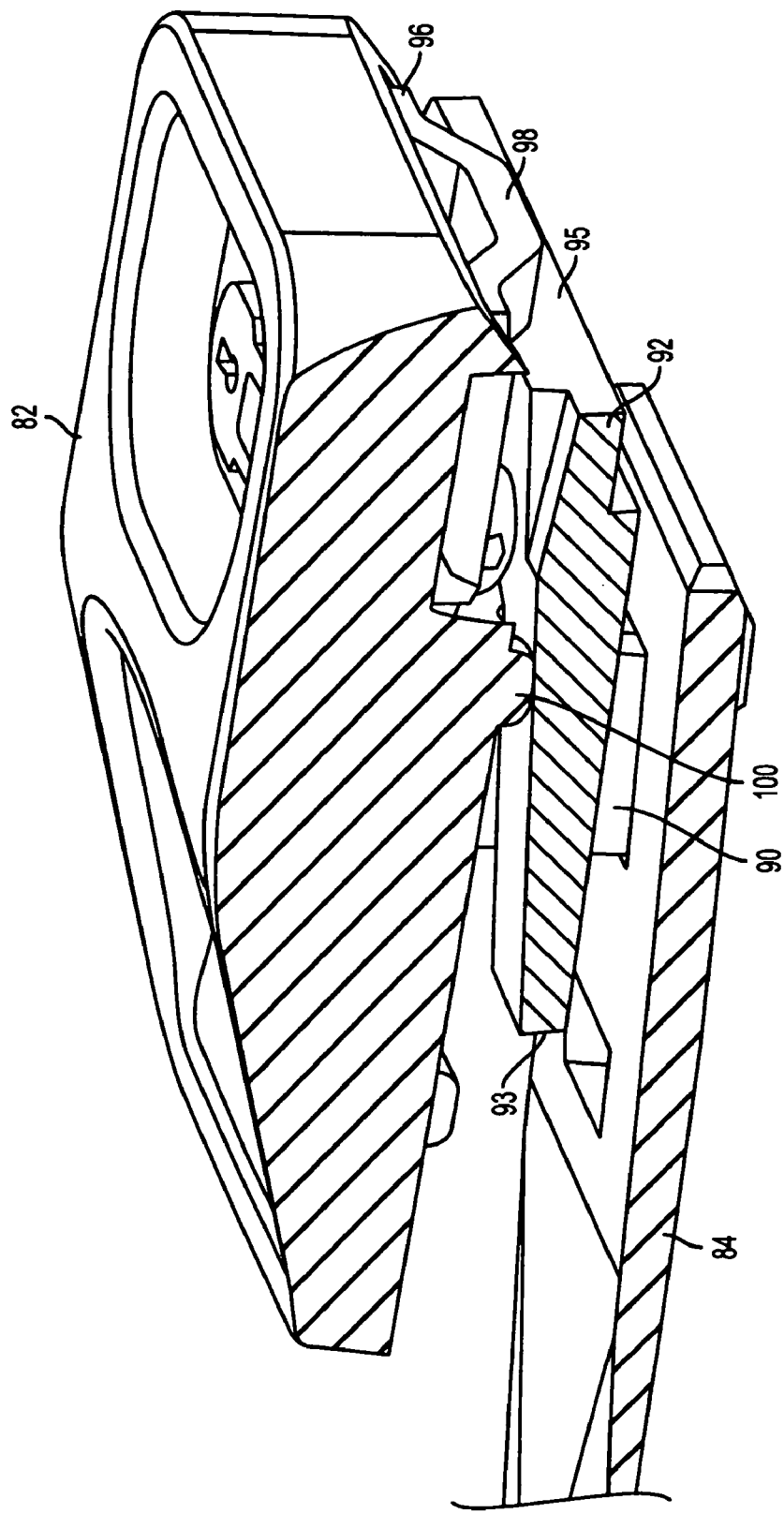
FIG. 16 is a perspective partial cross-sectional view of the front portion of the slider button trigger when actuated.

Turning to FIGS. 15-16, the slider button 82 may be molded onto an insert 96, preferably made from metal, having a hook portion 98. Slider button 82 also may include a pivot 100 which preferably is integral with or fixedly attached to the slider button 82. As described below, these features assist in the actuation of the angle grinder 10.

In a preferred embodiment, the slider button trigger 80 is biased to an OFF position as shown in FIGS. 13, 15 and 17 through 18. Switch 24 preferably includes a biasing member such as a spring (not shown) to bias the slider button trigger 80 to the OFF position. As can be seen in FIG. 13, 15, 16 and 18, sliding movement of the slider button trigger 80 towards the second end 22 of the field case 16 preferably moves the second link member 86, the first link member 84, slider button 82, and insert 96 toward the second end 22 of the field case 16. The sliding movement of the second link member 86 towards switch 24 operates the switch to ON, thus initiating operation of the angle grinder 10.

In a preferred embodiment, the slider button trigger 80 may also include a pivoting feature that allows the slider button trigger 80 to engage a portion of the field case 16 after it has been slidingly moved toward the second end 22 of the field case 16, locking it in place, thereby keeping the angle grinder 10 continuously activated.

Turning to FIG. 16, the slider button trigger 80 is shown in the locked position. To lock the slider trigger button 80 in place, a user slideably moves the slider button trigger 80 towards the second end 22 of the field case 16. In a preferred embodiment, as the slider button trigger 80 is moved, the slider button 82 as well as the insert 96 slide and pivot with respect to the field case 16. The rear portion of slider button 82 pivots upwardly away from the field case 16 while the front portion of slider button 82 and insert 96 pivot downwardly toward the field case 16 about pivot 100. The sliding and pivoting movement allows the hook 98 of the insert 96 to engage the second end 95 of the engagement member 92, locking the slider button trigger 80 in place. Since both the engagement member 92 and the insert 96 are preferably made from metal, the wear on the engaging portions of these structures is reduced.

To unlock the slider trigger button 80, a user preferably depresses the rear portion of the slider button 82 toward the field case 16. This pivots the front end of the slider button 82 and the insert 96 upwardly away from the field case 16 disengaging the hook 98 of the insert 96 from the second end 95 of the engagement member 95, thereby disengaging slider button trigger 80. In a preferred embodiment, the biasing force from the biasing member of switch 24 returns the slider button trigger 80 back to the OFF position.

In addition to the locking ability, the pivoting feature of the slider button trigger 80 may also assist in preventing jamming of the slider button trigger 80 during use. As the slider button trigger 80 is slideably moved, the slider button 82 pivots with respect to the field case 16. In a preferred embodiment, the rear portion of slider button 82 pivots upwardly away from the field case 16 pulling the posts 90 as well as the first link member 84 upwardly. This results in the first link member 84 and the second link member 86 contacting the inner surface of the housing 12 as the slider button trigger 80 is slideably moved. In a preferred embodiment, as the rear portion of the slider button 82 is depressed and the trigger button assembly 80 is slideably moved away from the second end 22 of the field case 16, the downward pivoting of the rear portion of the slider button 82 results in the downward movement of the posts 90 and the first link member 84. This results in the first link member 84 and the second link member 86 moving downwardly away from the inner surface of the housing 12.

The contact and non-contact of the first and second link members 84, 86 with the inner surface of the housing 12 will dislodge and allow for the escape of any artifacts, particles or dust that may have attached to the inner surface of the housing 12 or may have attached to the first and second link members 84, 86.

Figure 17:
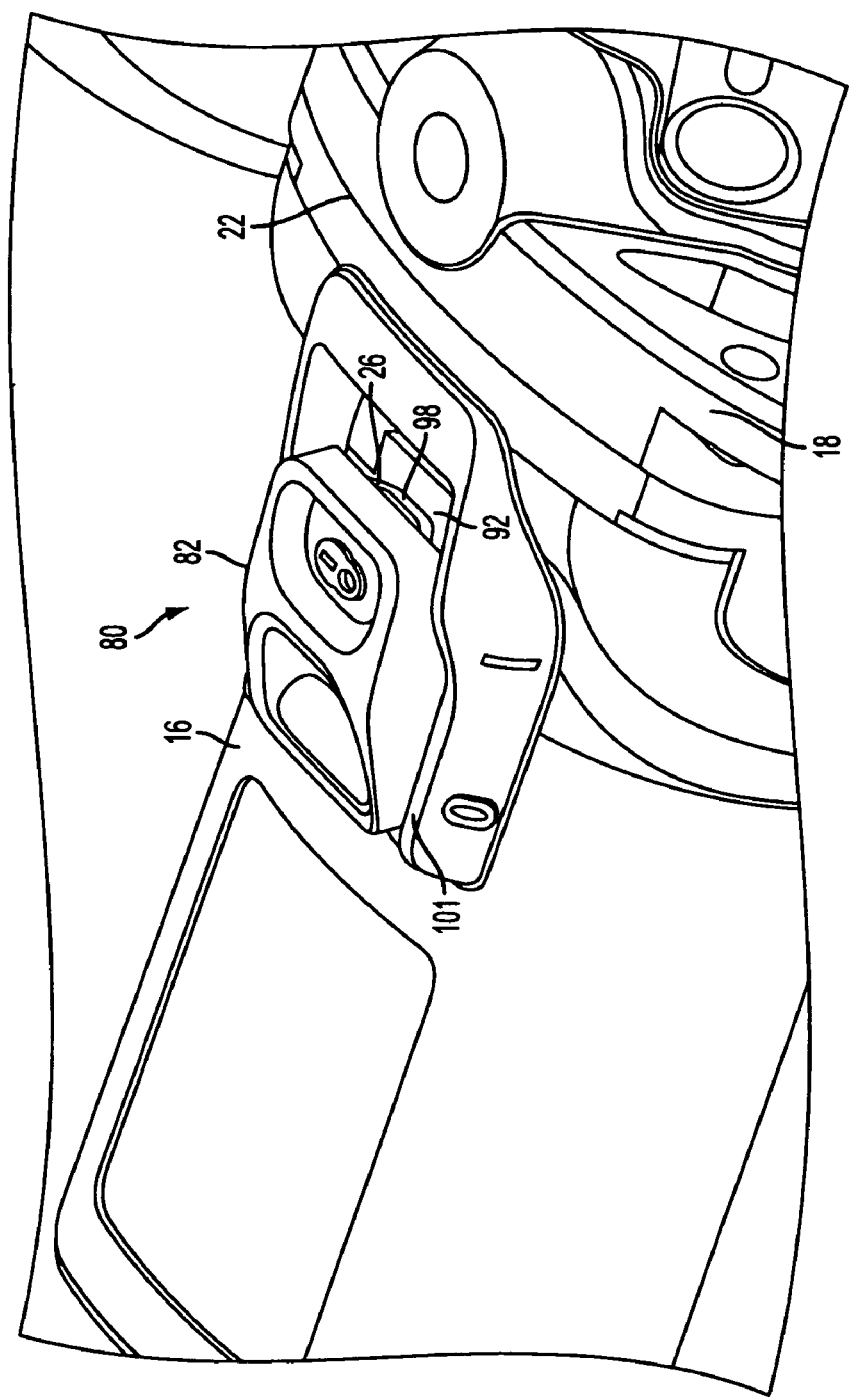
FIG. 17 is a perspective view of the slider button trigger detailing a field case surrounding the slider button trigger.

Turning to FIG. 17, in a preferred embodiment, the slider button 82 may be molded and/or shaped for easier interfacing by the user. In a preferred embodiment, a portion 101 of the field case 16 surrounding the slider button 82 may also be molded and/or shaped, for example in an recessed, arcuate fashion, to allow for greater access to the slider button 82 by a user.

Figure 18:
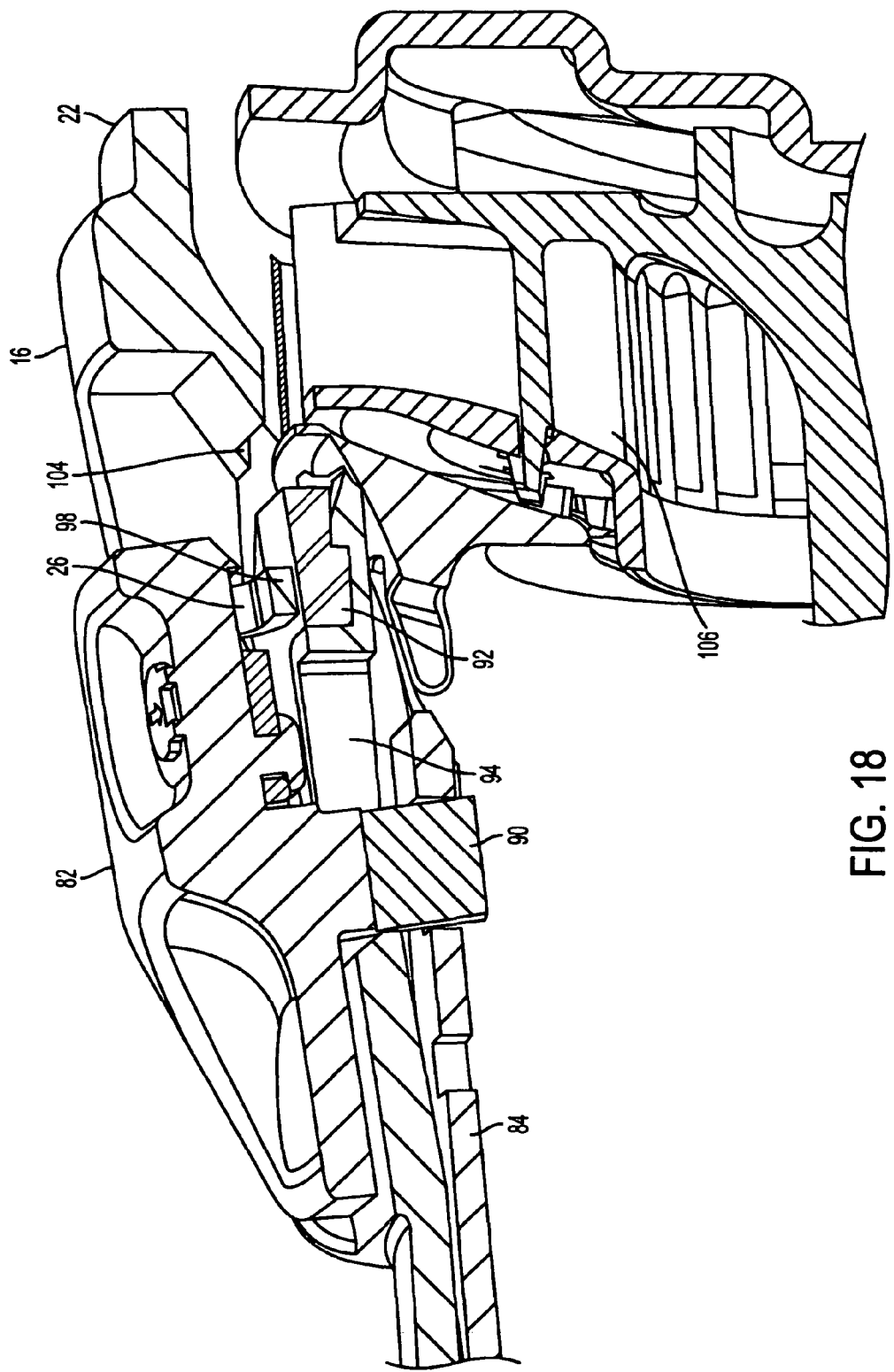
FIG. 18 is a perspective cross-sectional view of the slider button trigger, the field case, and an airflow assembly.

With reference to FIG. 18, in a preferred embodiment, a second aperture 104 may be included in the field case 16 for assisting with the evacuation of any dust, particles, or artifacts that may have entered into the housing 12 of the angle grinder 10. The second aperture 104 may be located proximate to aperture 94, near the second end 22 of the field case 16. Aperture 94 and second aperture 104 are preferably disposed in functional positions with respect to a front fan 106 located in the field case 16. In a preferred embodiment, angle grinder 10 includes an airflow assembly for circulating air through the field case 16. The airflow assembly preferably includes a baffle 108 located between the motor 28 and the field case 16 and the front fan 106. The baffle 108 and the fan 106 create a high-pressure zone around the fan 106 and a low-pressure zone behind the baffle 108 and the fan 106. With such an arrangement, any artifacts, particles, or dust that enter into angle grinder 10 via the aperture 94 are directed towards and blown out the second aperture 104 rather than blown towards the motor 28. This arrangement helps prevent jamming of the slider button trigger 80 and, more specifically, helps prevent the jamming of the slider button 82 with respect to the field case 16. This arrangement also helps reduce the ingestion and buildup of artifacts, particles, or dust in the housing 12 of the angle grinder 10.

Particle Separation Assembly

Figure 19:
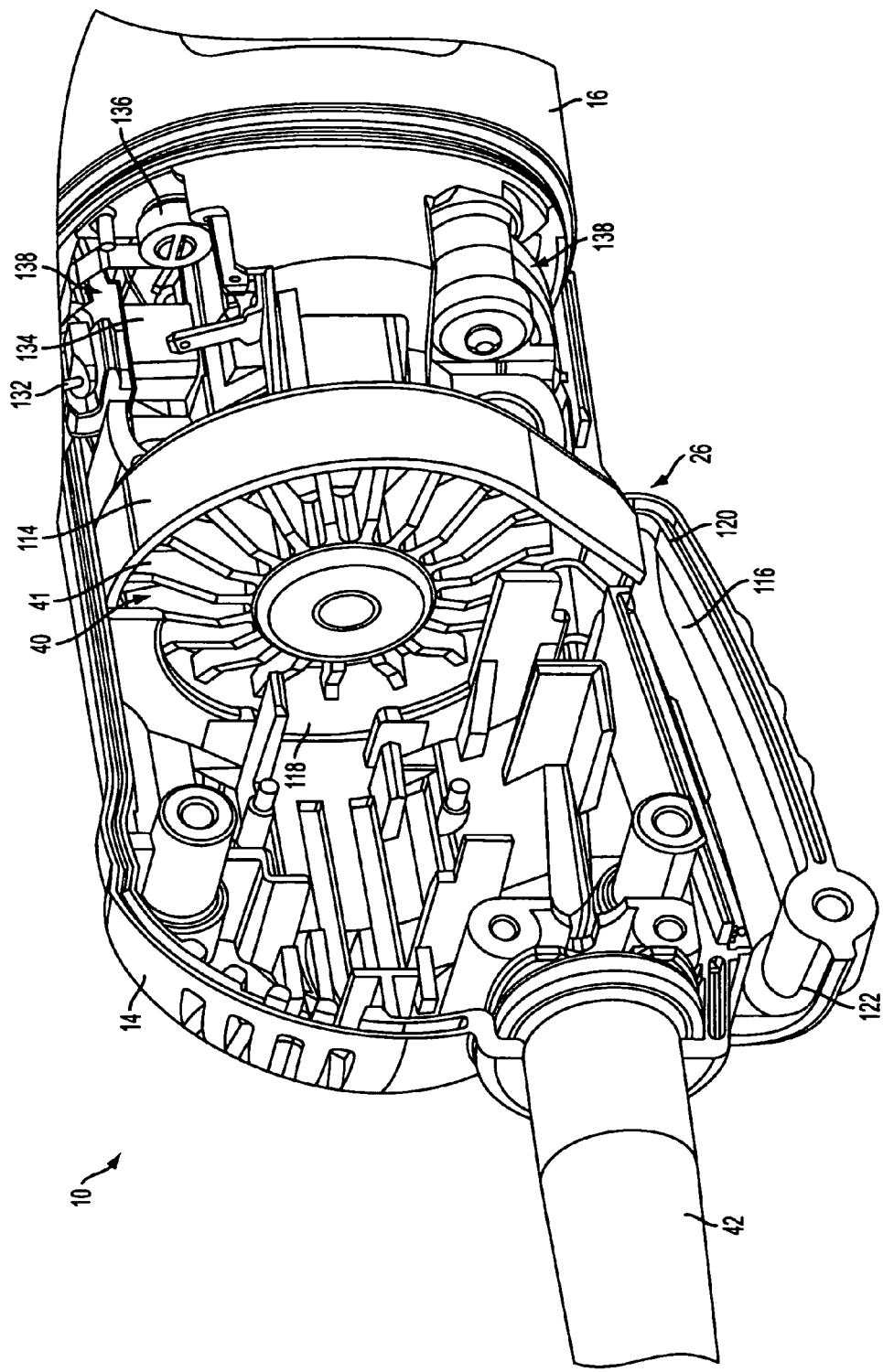
FIG. 19. is a perspective partial cross-sectional view of the handle portion detailing a particle separation assembly.
Figure 20:
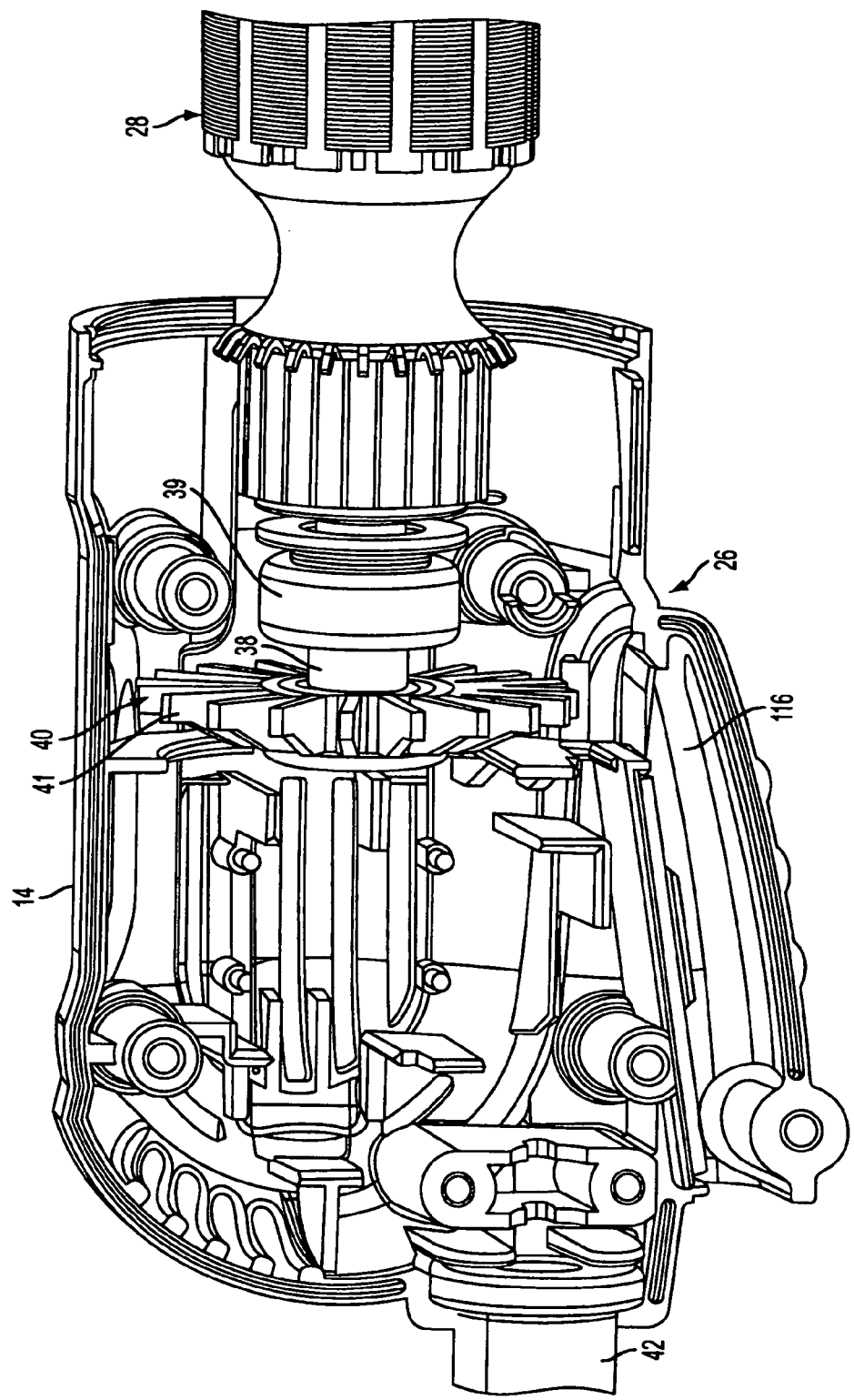
FIG. 20 is a rear perspective partial cross-sectional view of the handle portion detailing the particle separation assembly.

Referring to FIGS. 19 and 20, in a preferred embodiment, angle grinder 10 may include a particle separation assembly 26 located in the handle portion 14. The particle separation assembly 26 is also designed to remove any artifacts, particles, or dust that may have been ingested by the angle grinder 10. Preferably, the particle separation assembly 26 includes a fan 40, a baffle 114, and an exhaust channel 116. In another preferred embodiment, instead of the baffle 114, a channel or raceway integral with the inner surface of handle portion 14 may be used to collect the ingested artifacts, particles, or dust.

The particle separation assembly 26 may be driven by the motor 28. As can be seen in FIG. 18, the fan 40 may be axially connected to the motor 28 via the second motor spindle 38. During operation of the angle grinder 10, the motor 28 via second motor spindle 38 may be rotatably driven fan 40. The rotation of the fan 40 creates a twisting or rotational air current which draws air from the handle portion 14 of the angle grinder 10 and pushes it out of the exhaust channel 116. The twisting or rotational air current also results in the creation of centrifugal forces which moves any artifacts, particles, or dust that may have been ingested by the angle grinder 10 outwardly into a channel 118 of the baffle 114. In addition to the centrifugal forces pushing the artifacts, particles, or dust into the channel 118 of the baffle 114, the blades 41 of the fan 40 may also physically contact the ingested artifacts, particles, or dust pushing them into the channel 118 of the baffle 114. The exhaust channel 116 is preferably in communication with channel 118 of the baffle 114, so any artifacts, particles, or dust that are drawn into channel 118 are then pushed out of the angle grinder 10 via an exit in the exhaust channel 116.

In a preferred embodiment, the geometry of exhaust channel 116 changes from first end 120 to second end 122. Preferably, the dimensions of the exhaust channel 116 gradually increase from the first end 120 to the second end 122, thus the area of the exhaust channel 116 gradually increases from the first end 120 to the second end 122. By having the area of the exhaust channel 116 gradually increase, the outgoing air pushing out the artifacts, particles, or dust is slowed down preventing jamming of the exiting artifacts, particles, or dust.

Figure 21:
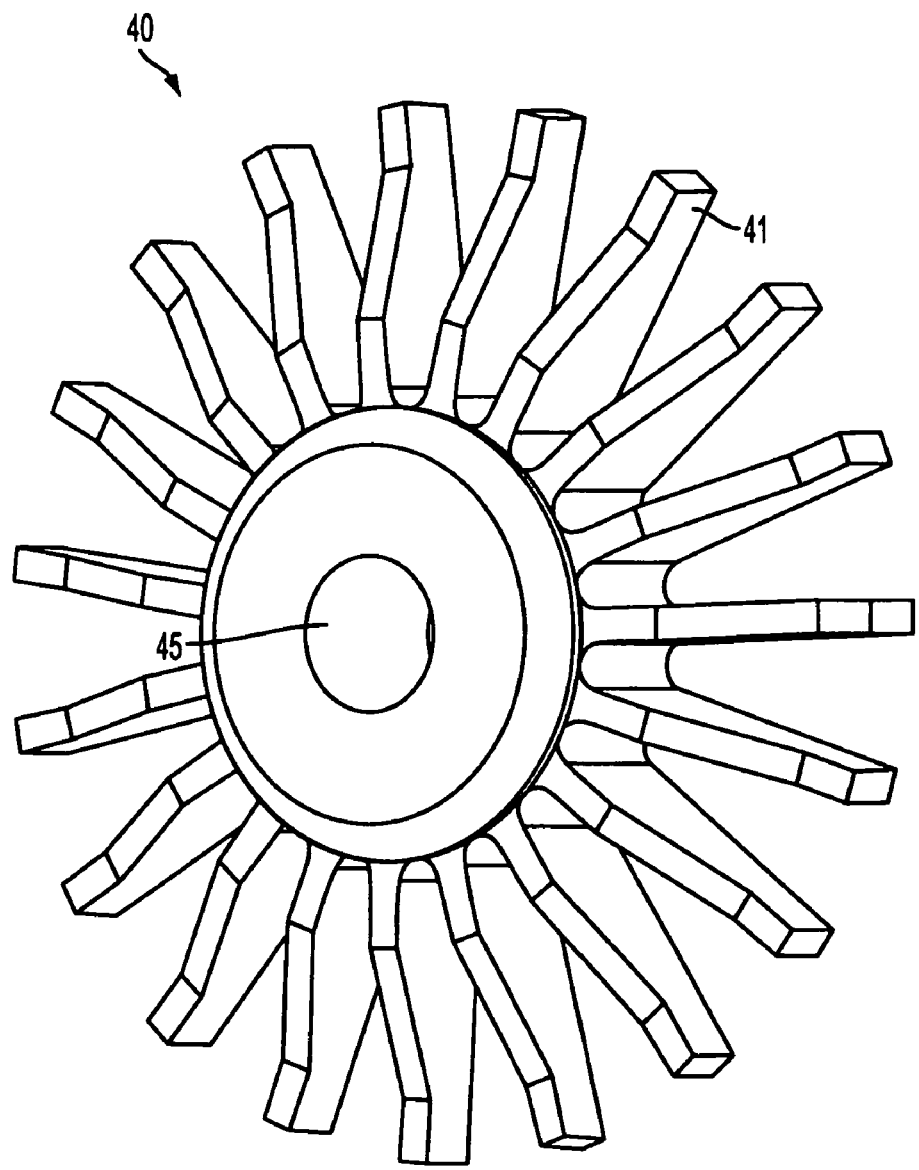
FIG. 21 is a perspective view of a fan from the particle separation assembly.
Figure 22:
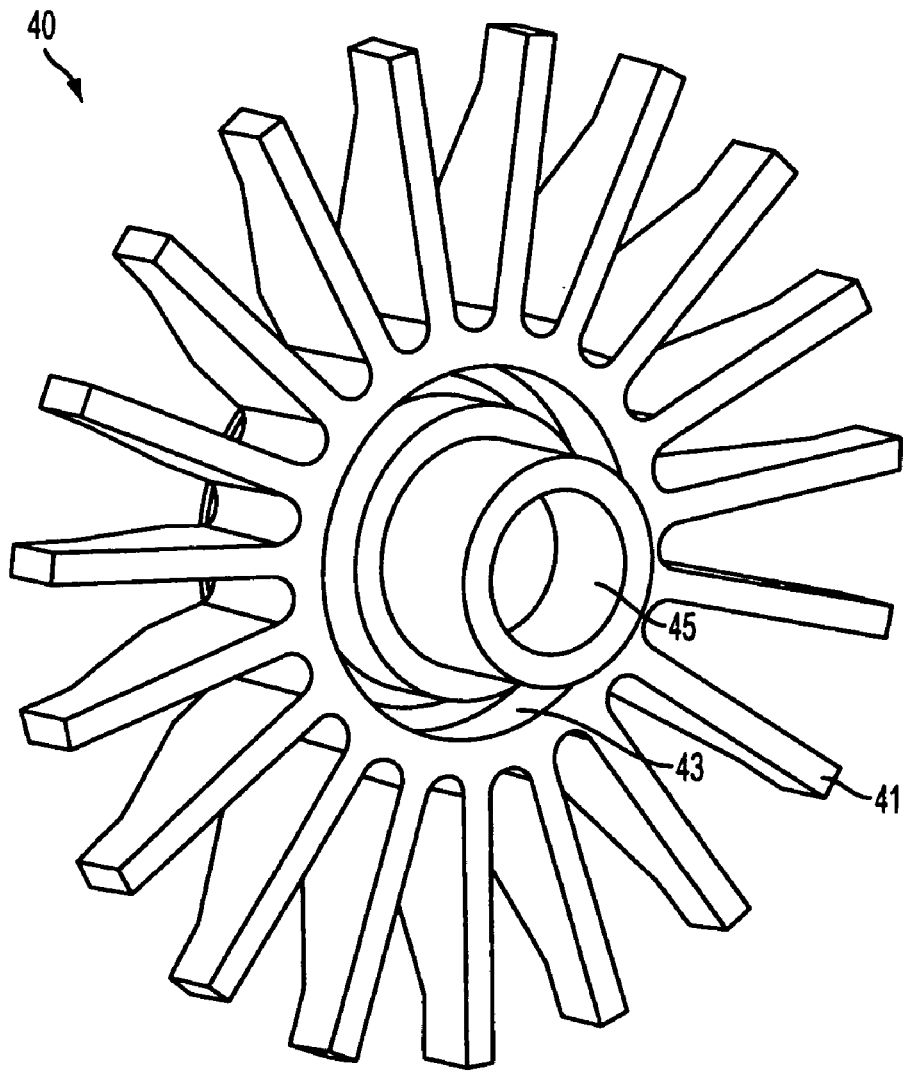
FIG. 22 is a rear perspective view of the fan from the particle separation assembly.

Turning to FIGS. 21 and 22, the fan 40 of the particle separation assembly 26 is shown. In a preferred embodiment, the blades 41 of the fan 40 can be thinned to reduce the speed of the air exiting the exhaust channel 116. In an alternate embodiment, the blades 41 of the fan 40 can be pitched or angled to increase the air speed exiting the exhaust channel 116. The fan 40 may also include a labyrinth feature 43 to seal and protect the bearing 39 located on second motor spindle 38 from the artifacts, particles, or dust ingested by the angle grinder 10. In a preferred embodiment, the fan 40 has a generally cylindrical opening 45 for receiving the second motor spindle 38.

Motor—Brush Biasing System

Figure 23:
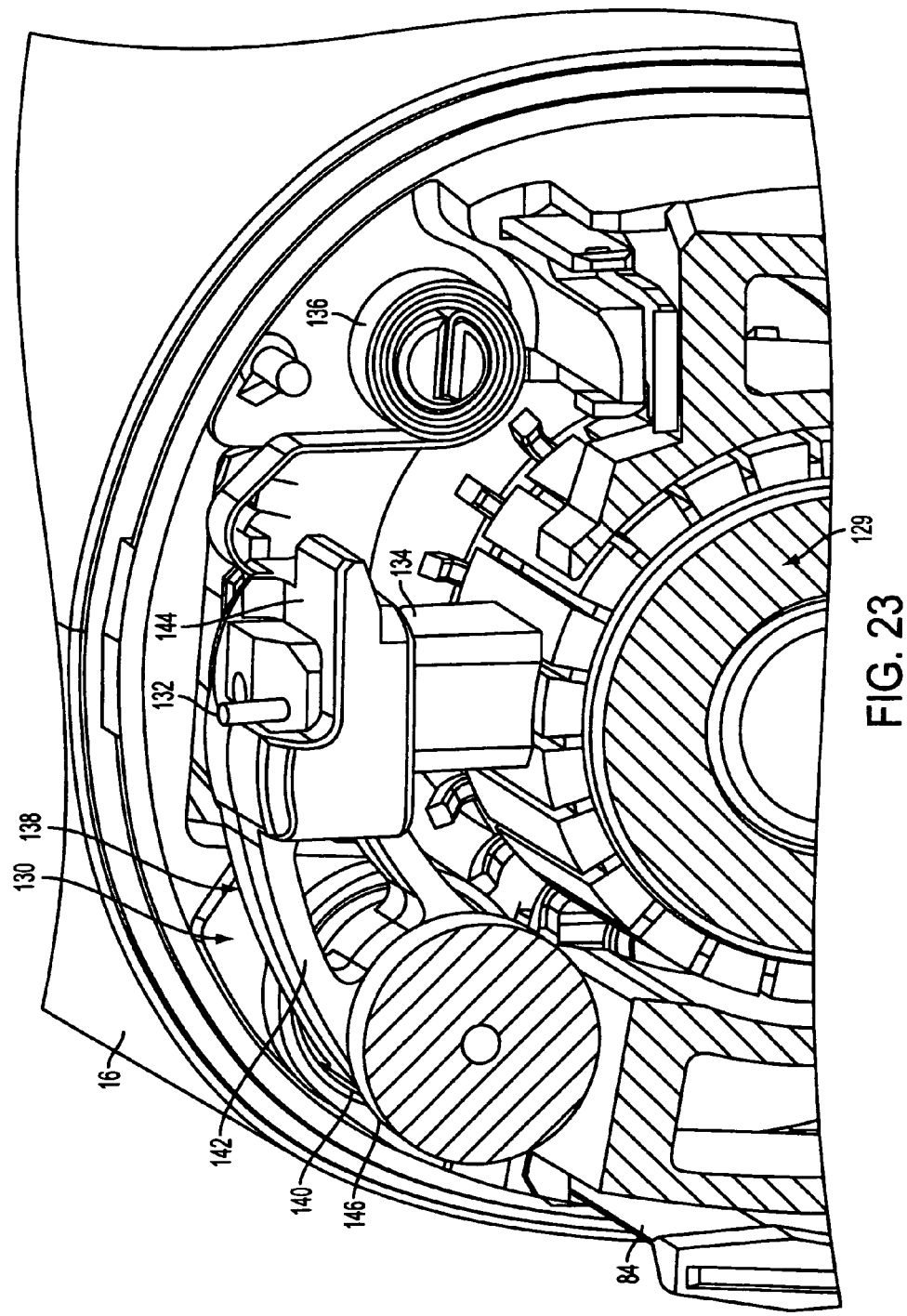
FIG. 23 is a perspective partial cross-sectional view of a brush biasing system.
Figure 24:
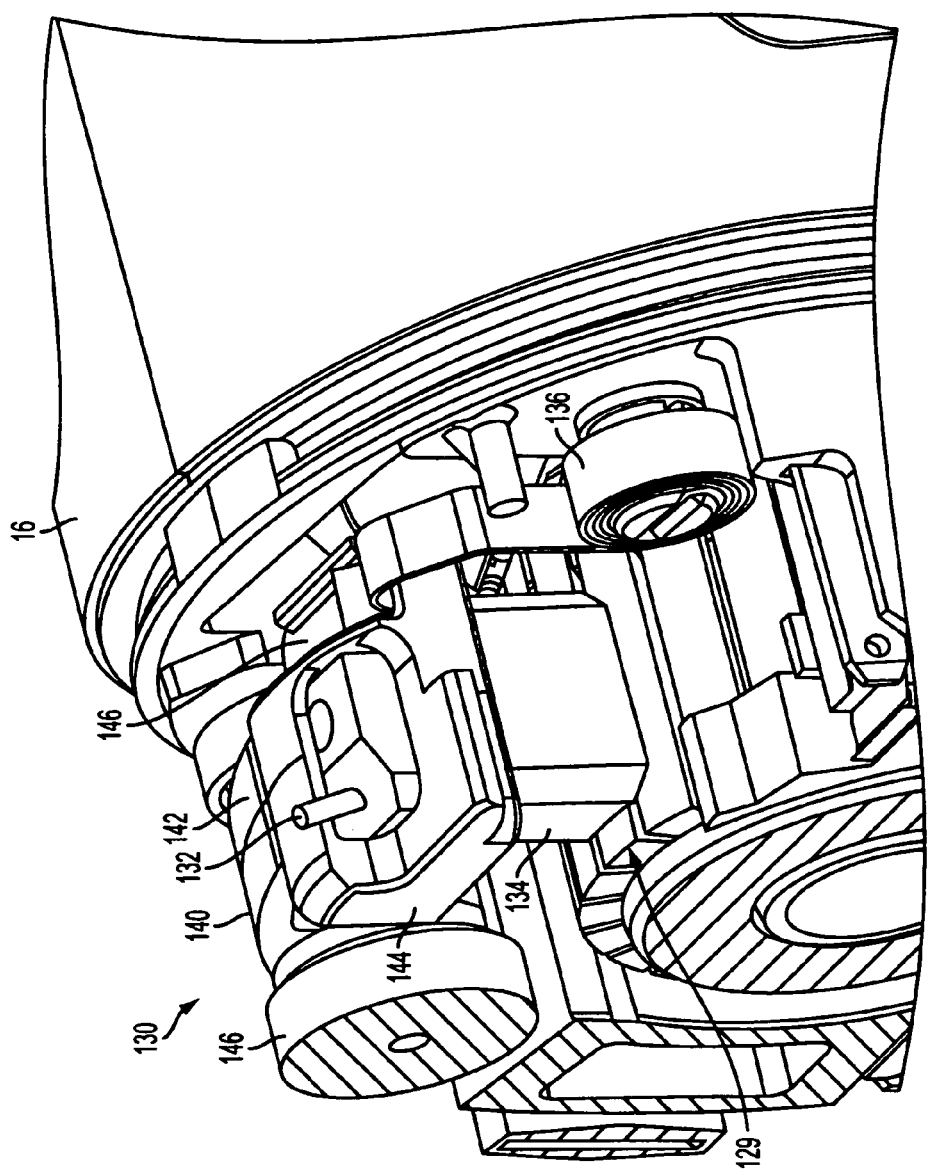
FIG. 24 is a side perspective partial cross-sectional view of the brush biasing system.

The motor 28 in the angle grinder 10 may preferably be a universal series motor of a type commonly known in the art. With particular reference to FIGS. 1, 23, and 24, the motor 28 generally includes the motor spindle 30, the second motor spindle 38, a motor armature, a field pole, field windings, a commutator 129, at least one brush holder assembly 130, and at least one electrical lead 132.

The electrical lead 132 links the brush 134 to the switch 24 for selective connection with a power source. More specifically, the brush 134, via the electrical lead 132 and wires 133 (not shown), provides the electrical connection between the rotating commutator 129 and the stationary switch 24 for providing power to the motor 28.

In order for the motor 28 to function properly and perform efficiently, the brush 134 should constantly and evenly contact the commutator 129. Additionally, during the life of the motor 28, the brush 134 gradually wears. Therefore, a compensation device, such as a spring 136, is included to continually press the brush 134 into contact with the commutator 129. Furthermore, the brush holder assembly 130 is pivotably attached to the housing in the handle portion 14 of the angle grinder 10 to allow the brush 134 to move as it wears.

Figure 25:
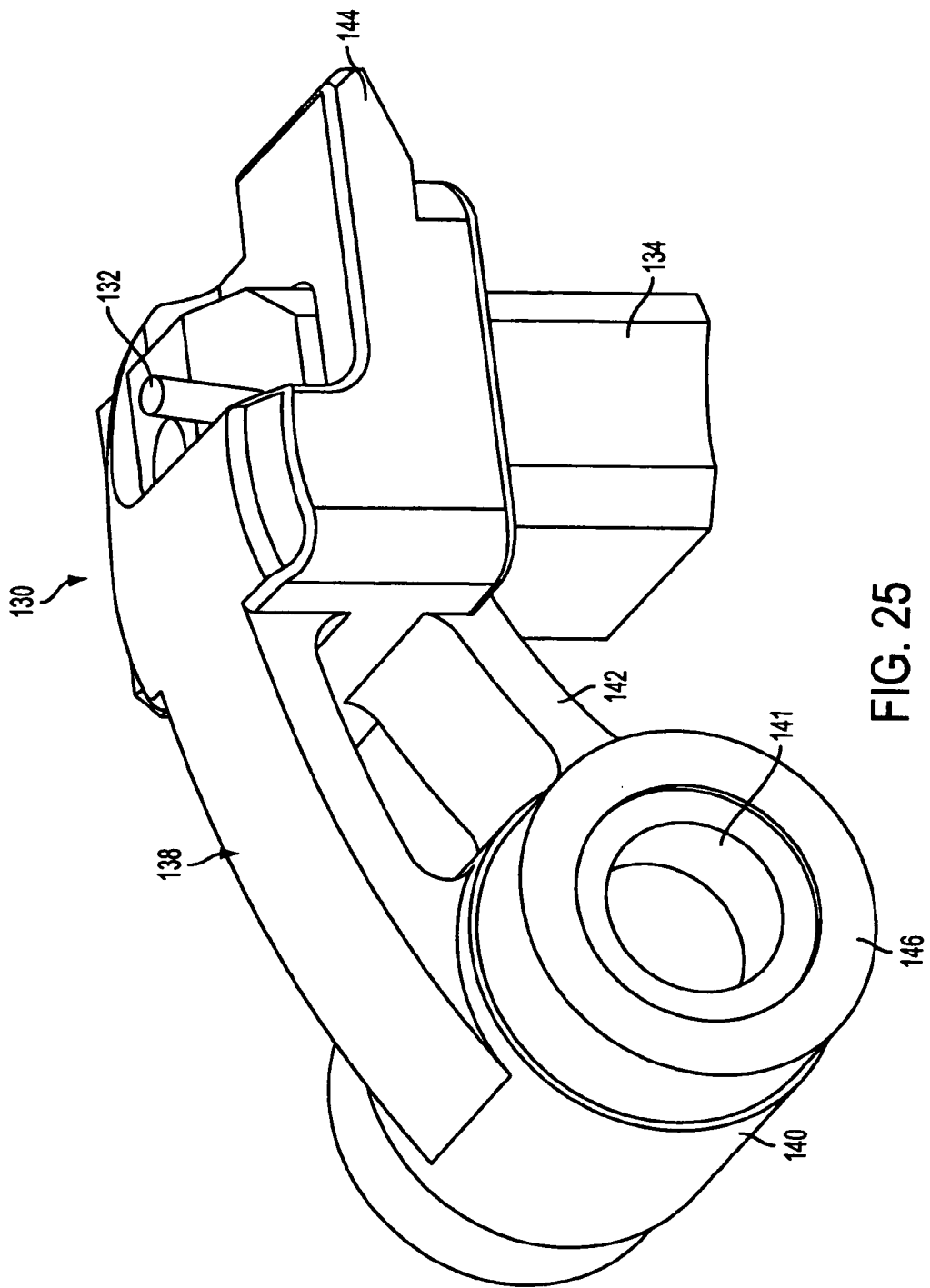
FIG. 25 is a perspective view of a brush holder assembly from the brush biasing system.
Figure 26:
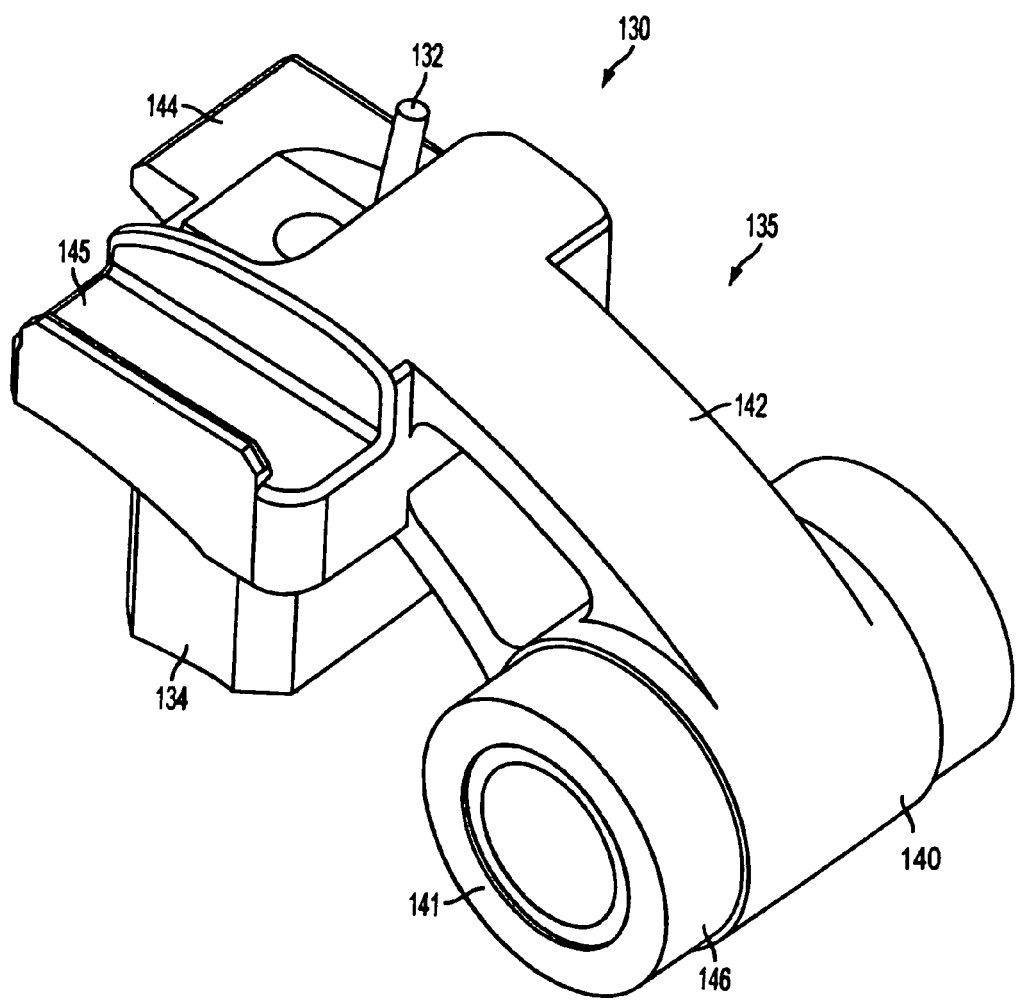
FIG. 26 is a rear perspective view of the brush holder assembly from the brush biasing system.

With reference to FIGS. 25 and 26, the brush holder assembly 130 includes the brush 134 and a brush arm 138. The brush arm 138 preferably is comprised of a base portion 140, an arm portion 142, and a brush engaging portion 144. In a preferred embodiment, the brush engaging portion 144 includes a channel 145 for receiving an end of the spring 136 and the base portion 140 includes a generally cylindrical opening 141 for pivotably receiving a portion of the housing 12. The base portion 140 also preferably includes rings 146, made from felt or similar material, to prevent jamming of the pivoting motion of the brush arm 138. The rings 146 are preferably axially received on the base portion 140 of the brush arm 138.

In a preferred embodiment, the brush arm 138 is made from a non-conductive material such as plastic. By fabricating the brush arm from a non-conductive material, the brush arm 138 as well as the spring 136 are insulated and not part of the electrical connection between the switch 24 and the brush 134. A problem that has existed with angle grinders is that during operation, there is a possibility that heated grinding artifacts may be ingested by the angle grinder. Once ingested, these heated artifacts, typically attracted to the live portions of the electrical connection between the brush and the switch, accumulate and sinter in that location, eventually melting and destroying the housing in that area. By removing the spring and brush arm from the electrical path, there are fewer live portions and consequently a smaller attraction area for the ingested heated artifacts. As a result, the ingested particles do not accumulate and sinter in a single location.

As discussed earlier, a pivoting feature and the compensation device is used to ensure that the brush 134 is constantly and evenly contacting the commutator 129. In a preferred embodiment, the brush arm 138 may also be dimensioned in such a fashion as to further ensure the brush 134 is in even and constant with the commutator 129. For example, the length of the arm portion 142 along with the location of the pivot point in the base portion 140 of the brush arm 138 can be determined such that a constant connection between the brush 134 and the commutator 129 is further ensured.

In an alternative embodiment, the brush 134 may be attached to the brush arm 138 via a brush box (not shown) rather than being directly connected to the brush arm 138 via the brush engaging portion 144.

Motor—Overload Indicator

In a preferred embodiment, angle grinder 10 may include a tactile overload indicator to warn the user of possible overloading on the motor 28. As described earlier, the angle grinder 10 has a grinder wheel 36 that is driven by the motor 28. During operation of the angle grinder 10, on occasion, the grinder wheel 36, while cutting through the desired material, may slow down or get stuck on the material being cut. This results in extra loading on the motor which could result in a shorter life for the motor 28. In order to identify the possible overloading on motor 28, the angle grinder 10 may include the overload indicator.

Figure 27:
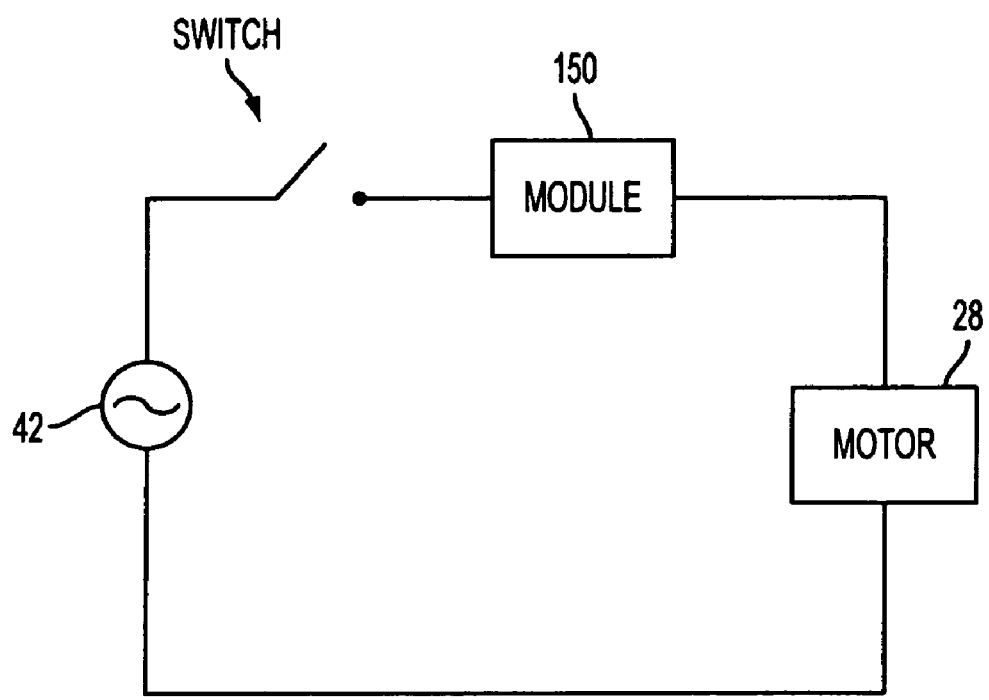
FIG. 27 is a schematic illustration of an overload indicator.
Figure 28:
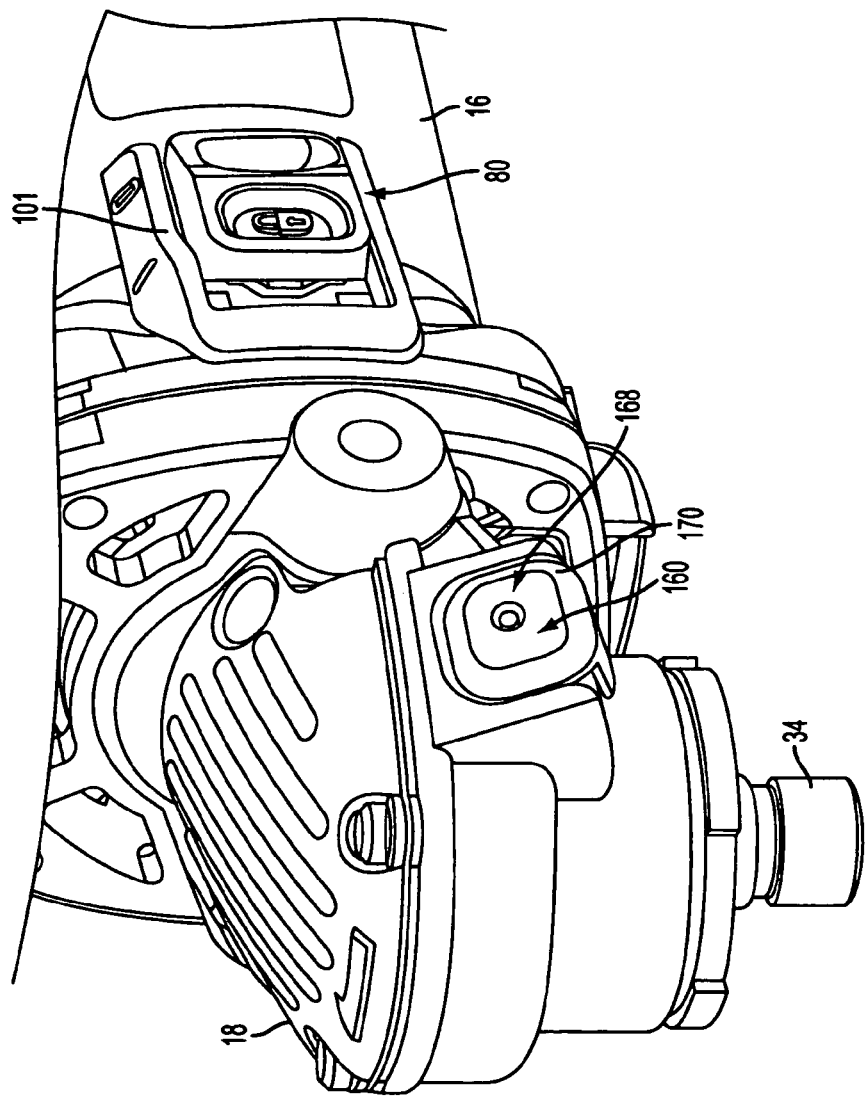
FIG. 28 is a perspective view of a front portion of the angle grinder detailing a spindle lock assembly.
Figure 29:
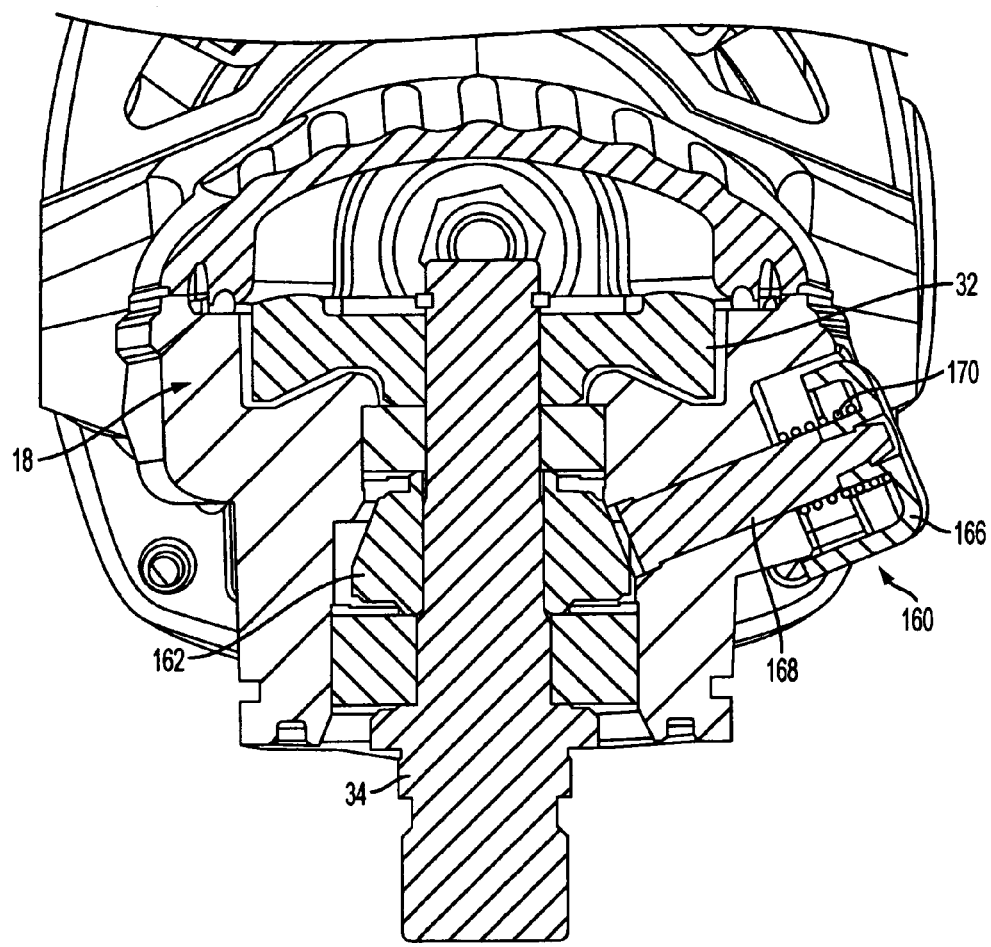
FIG. 29 is a cross-sectional view of the spindle lock assembly in the front portion of the angle grinder.

With reference to FIG. 27, the overload indicator is a module 150 wired into the circuitry that provides power to the motor 28 of the angle grinder 10. The module 150 is located in series with the switch (paddle trigger 48 or slider button trigger 80) and via an included sensor, the module 150 detects current surges that result from the overloading of the motor 28. When a current surge is detected, the module 150 pulses providing the user with a tactile warning of the overload on the motor 28. As long as the current surge is present, the module 150 will continue to pulse for a programmed amount of time. Once that programmed amount of time has lapsed, the module 150 will stop pulsing. In another preferred embodiment, the module 150 will automatically cut the power to the motor 28 once the programmed amount of time has lapsed.

Spindle Lock Assembly

Figure 30:
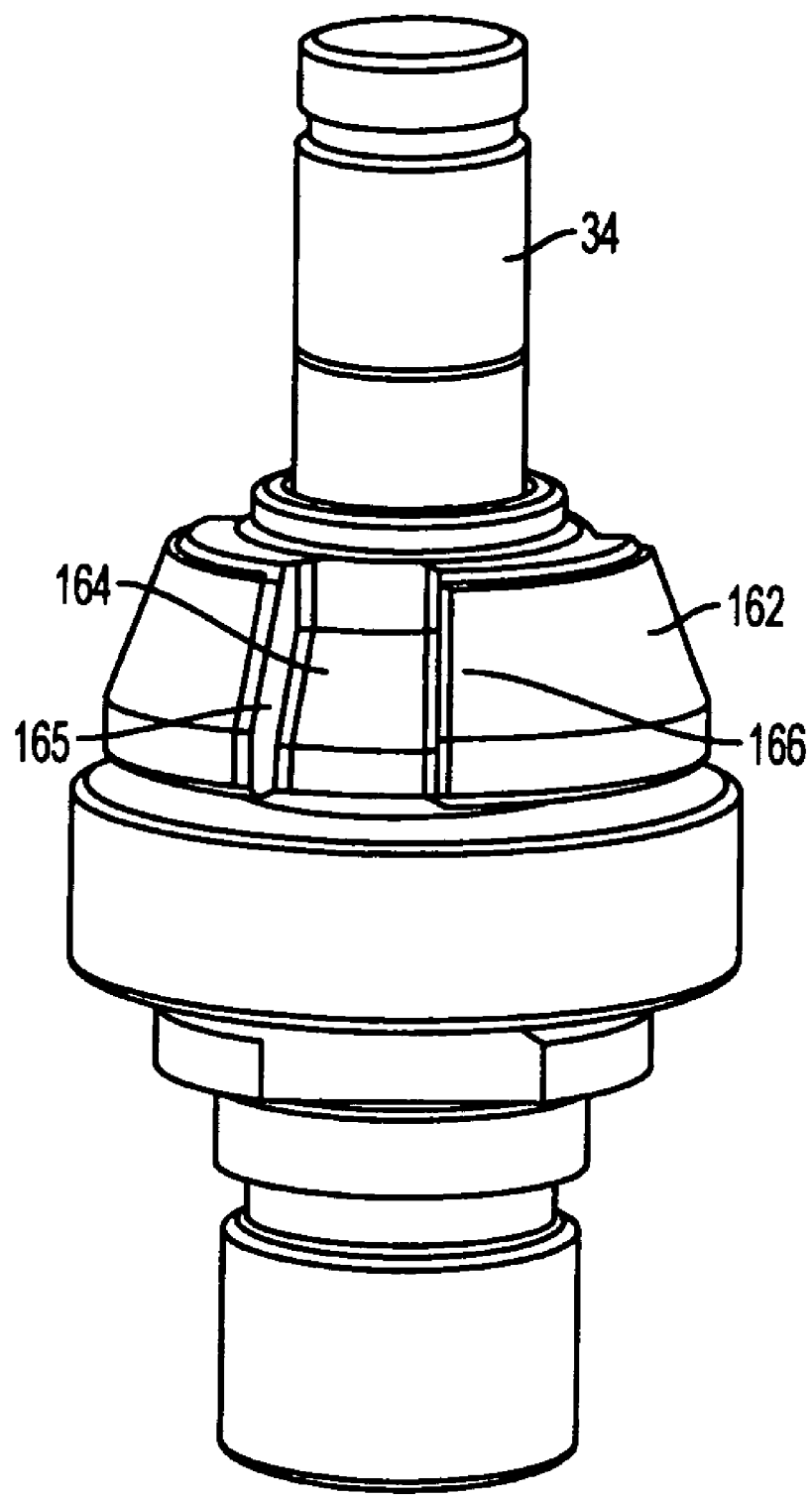
FIG. 30 is a perspective view of a spindle lock from the spindle lock assembly.

In a preferred embodiment, angle grinder 10 may also include a spindle lock assembly 160 in the gear case 18 to assist the user with removal of the grinder wheel 36. With reference to FIGS. 28 through 31, the spindle lock assembly 160 preferably includes a spindle lock 162 and a locking pin 168. With particular reference to FIG. 30, the spindle lock 162 is axially disposed on the wheel spindle 34 below driving gearset 32. In a preferred embodiment, spindle lock 162 cannot rotate independently of the wheel spindle 34. The spindle lock 162 preferably includes channels 164 for receiving the locking pin 168. Channels 164 may also include a raised feature such as ramps 166 located along the sides of channels 164. The ramps 166 are designed to prevent the locking pin from engaging channels 164 if the spindle lock 162 has a rotational speed that is too great. This prevents the user from accidentally engaging the spindle lock 162 and damaging the spindle lock 162 or the locking pin 168.

Figure 31:
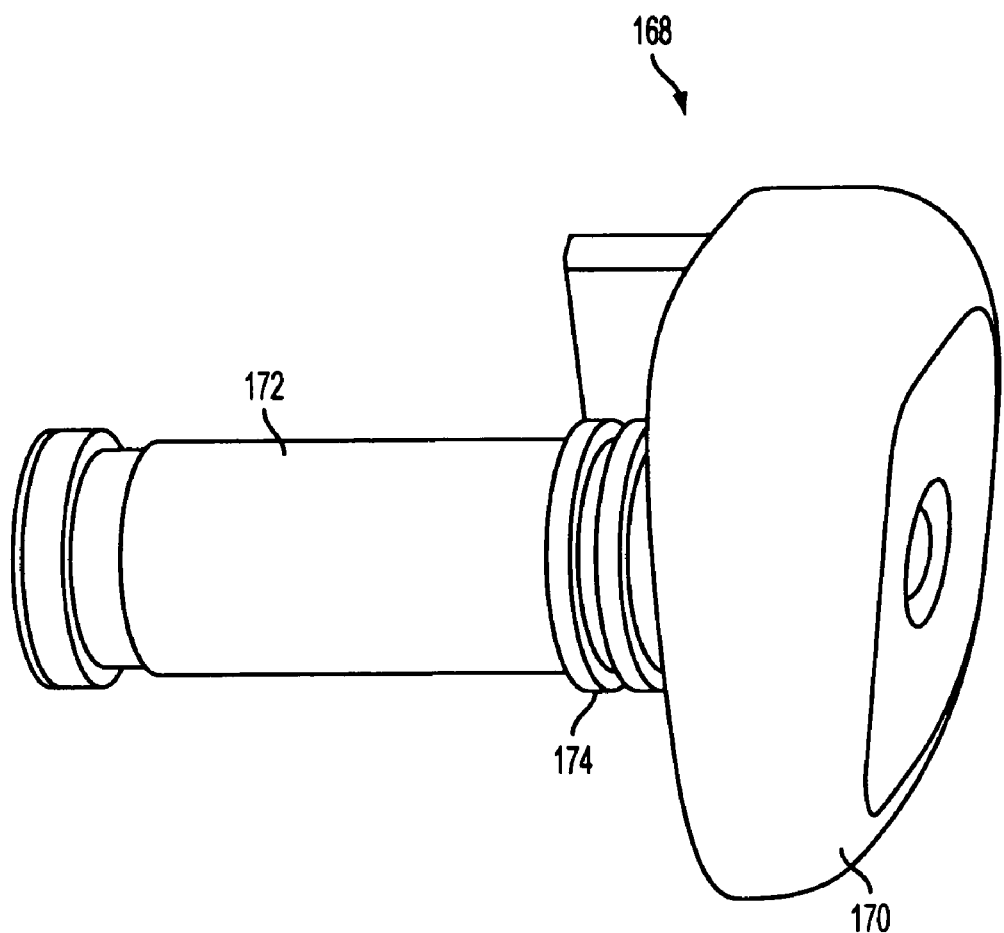
FIG. 31 is a perspective view of a locking pin from the spindle lock assembly.

With particular reference to FIG. 31, the locking pin 168 preferably includes a head portion 170, for user interface, attached to a pin portion 172. In a preferred embodiment, a biasing member such as spring 174 is located around the pin portion 168, proximate to the head portion 166. The biasing member biases the locking pin 168 outwardly, away from the spindle lock 162.

Referring back to FIGS. 28 and 29, the locking pin 168 is preferably disposed in the gearcase 18 in a diagonally offset position. Furthermore, the locking spindle 162 is preferably formed so that channels 164 are angled to receive the locking pin 168 in the diagonally offset position. The diagonal offset placement of the locking pin 168 offers both structural and ergonomic advantages. Structurally, the diagonal placement of the locking pin 168 allows the locking pin 168 to be located in a stronger section of the gearcase 18. Ergonomically, the diagonal placement of the locking pin 168 allows the locking pin 168 to be located in a position that allows the user to simultaneously grip the angle grinder 10 and the locking pin 168 more easily than the prior art grinders.

As mentioned earlier, the spindle lock assembly 160 is used to assist with removal of the grinder wheel 36. To use the spindle lock assembly 160, a user depressed the locking pin 168 by pushing the head portion 166 of the locking pin 168 inwardly with respect to the gear case 18. This moves the pin portion 172 diagonally downwards into one of the channels 164 of spindle lock 162. Once in the channel 164, the pin portion 172 of locking pin 168 abuts a side 165 of the channel 164 preventing spindle lock 162 and thus wheel spindle 34 from rotating. A user can then remove the grinder wheel 36 from the angle grinder 10.

Anti-Locking Flange

In a preferred embodiment, angle grinder 10 may also include an anti-locking flange assembly 180 in the gear case 18. Traditionally, in some grinders, the grinder wheel was held in place on the wheel spindle by two flanges, one on each side of the grinder wheel. Typically, the upper flange was slidingly received on the wheel spindle while the lower flange was threadingly received on the wheel spindle. As the grinders were used, the threadedly attached flange had a tendency to over-tighten. This over-tightening potentially resulted in the flanges, particularly the threadingly attached flange, locking on to the wheel spindle preventing the user from being able to remove the grinder wheel when it came time to change the grinder wheel. As will be explained below, the anti-locking flange assembly 180 of the present invention is designed to prevent the flanges holding the grinder wheel 36 from over-tightening during operation of the angle grinder 10.

With reference to FIGS. 1 and 32 through 36 and 39, the anti-locking flange assembly 180 preferably includes a truncated annular portion 182, having at least one truncated end 183, on the wheel spindle 34, an upper flange 184 and a lower flange 186. In a preferred embodiment, the truncated annular portion 182 has two truncated ends 183 located diametrically opposite to each other.

Figure 32:
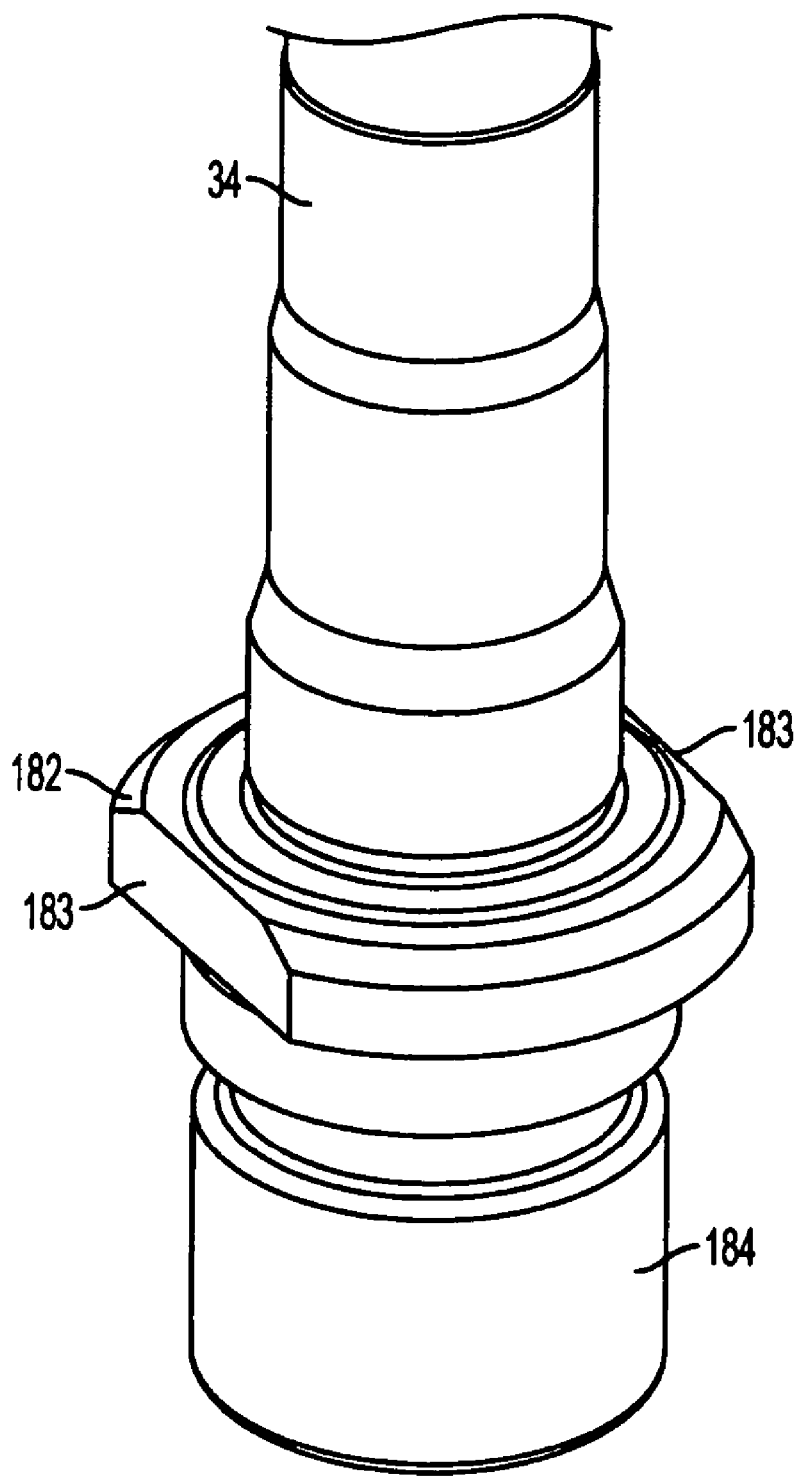
FIG. 32 is a partial perspective view of a wheel spindle from an anti-locking flange assembly.

With particular reference to FIG. 32, proximate to the truncated annular portion 182, the lower end of wheel spindle 34 preferably has a threaded portion 184. The truncated annular portion 182 slideably receives the upper flange 184 and the threaded portion 184 threadingly receives lower flange 186. As shown in FIG. 1, the grinder wheel 36 is disposed between the upper flange 184 and the lower flange 186 on the wheel spindle 34.

Figure 33:
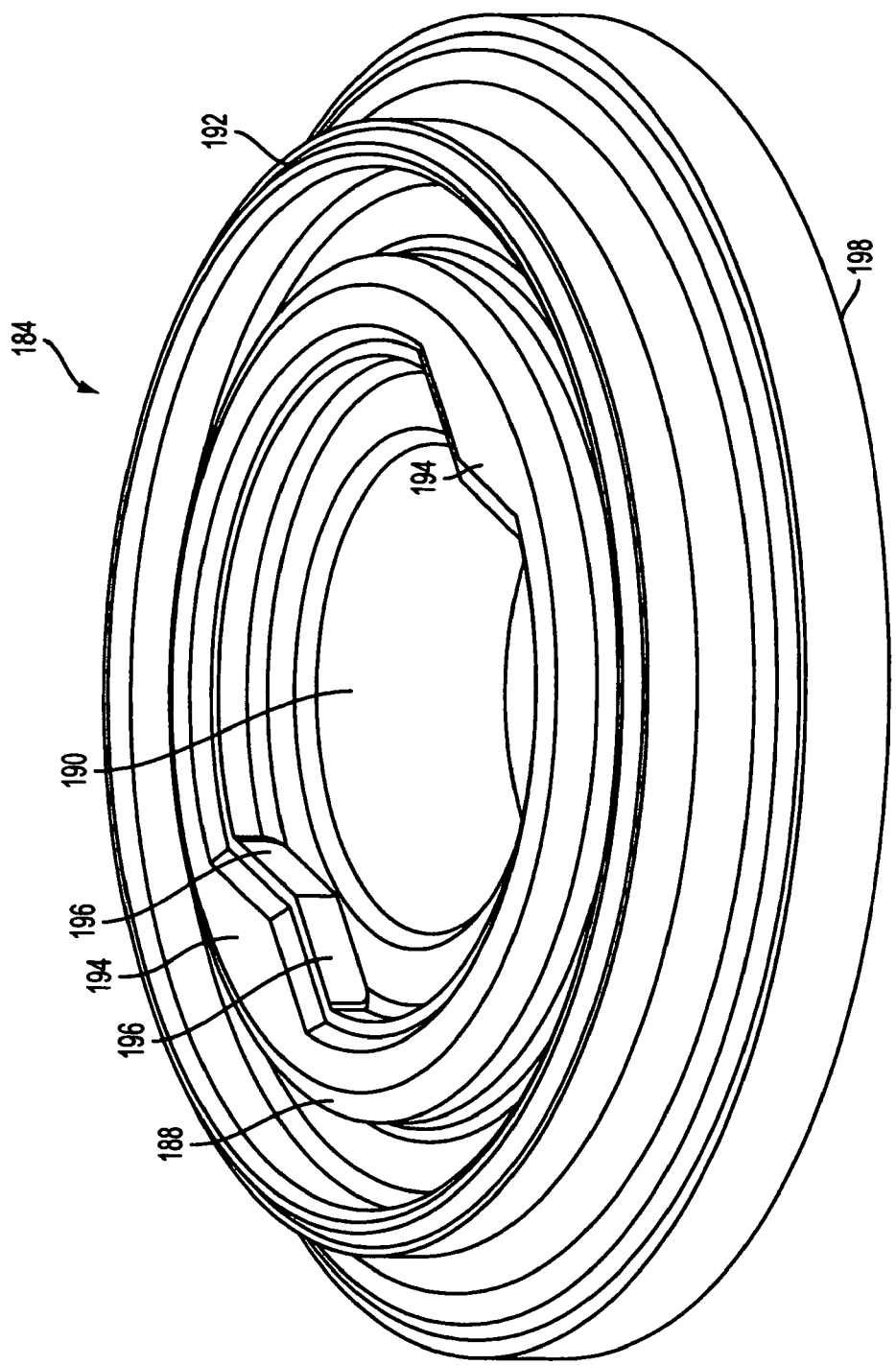
FIG. 33 is a perspective view of an upper flange from the anti-locking flange assembly.
Figure 34:
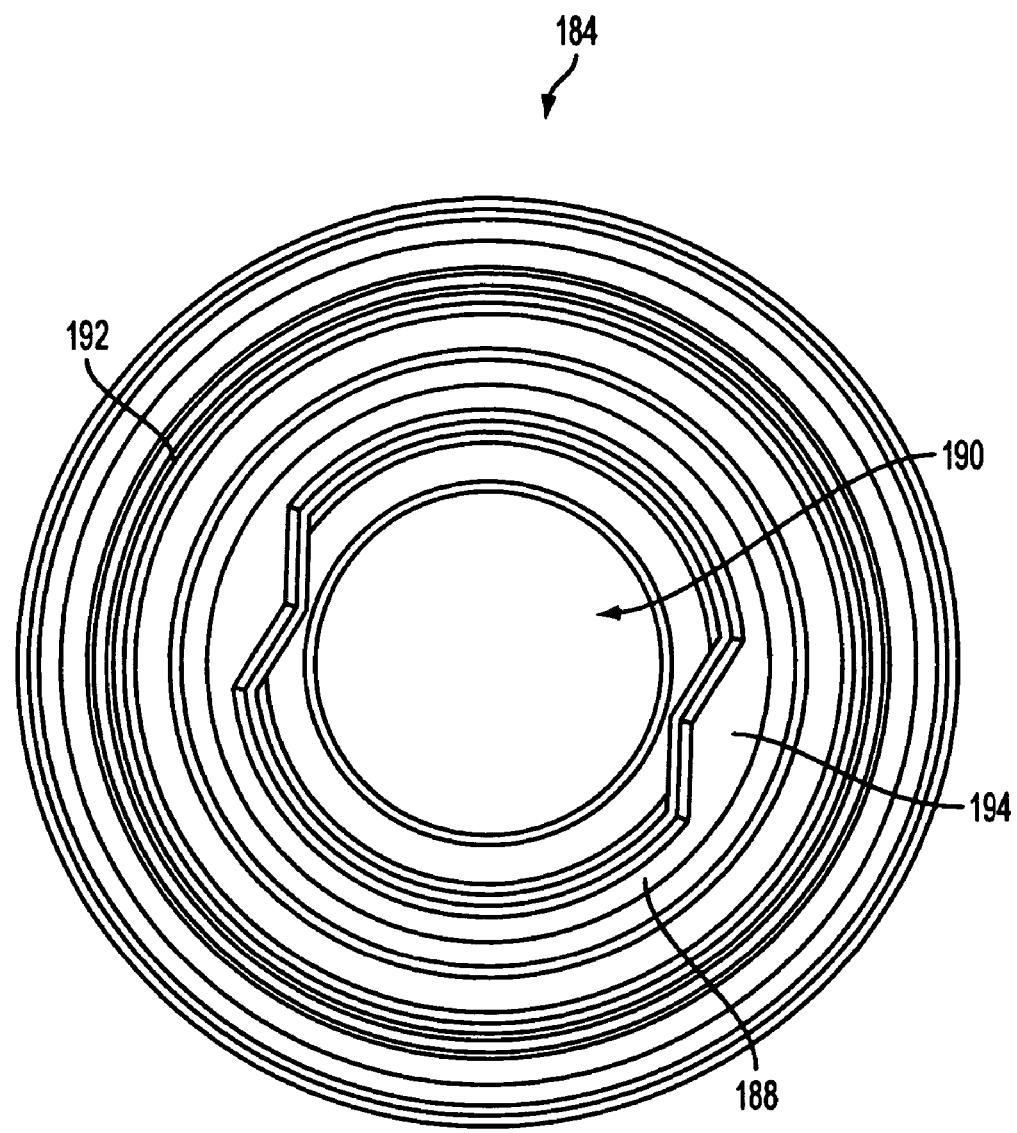
FIG. 34 is a top down view of the upper flange from the anti-locking flange assembly.

Turning to FIGS. 33 and 34, the upper flange 184 preferably has a first collar 188, a stepped, annular through-hole 190 for slideably receiving the truncated annular portion 182 of the wheel spindle 34, and a second collar 192 for receipt into a labyrinth feature in gear case 18, discussed below.

The first collar 188 preferably has at least one, preferably two, protrusions 194 that extend from the first collar 188 toward the stepped, annular through-hole 190. Preferably, the protrusion 194 has two engagement ends 196 that are disposed at an angle ranging between 140° and 170° with respect to each other. In a preferred embodiment, the angle between the engagement ends 196 is 165°. As will be explained below, the protrusion 194 and the truncated annular portion 182 of the wheel spindle 34 assist in preventing the flanges holding the grinder wheel 36 from over-tightening during operation of the angle grinder 10.

In a preferred embodiment, the upper flange 184 may also have a collar 200 (shown in FIG. 1) on its end 198. The collar 200 may be used to assist in centering the grinding wheel 36 on wheel spindle 34. In an alternative embodiment, the upper flange 184 may also include an elastomeric material on its end 198 to dampen the impact the grinder wheel 36 may impart on the threaded coupling joint between the spindle wheel 34 and the lower flange 186. In another alternative embodiment, the upper flange 184 may also include a lubricious material coating, such as nickel Teflon, on its end 198 to reduce the amount of torque necessary to remove the grinder wheel 36.

Figure 35:
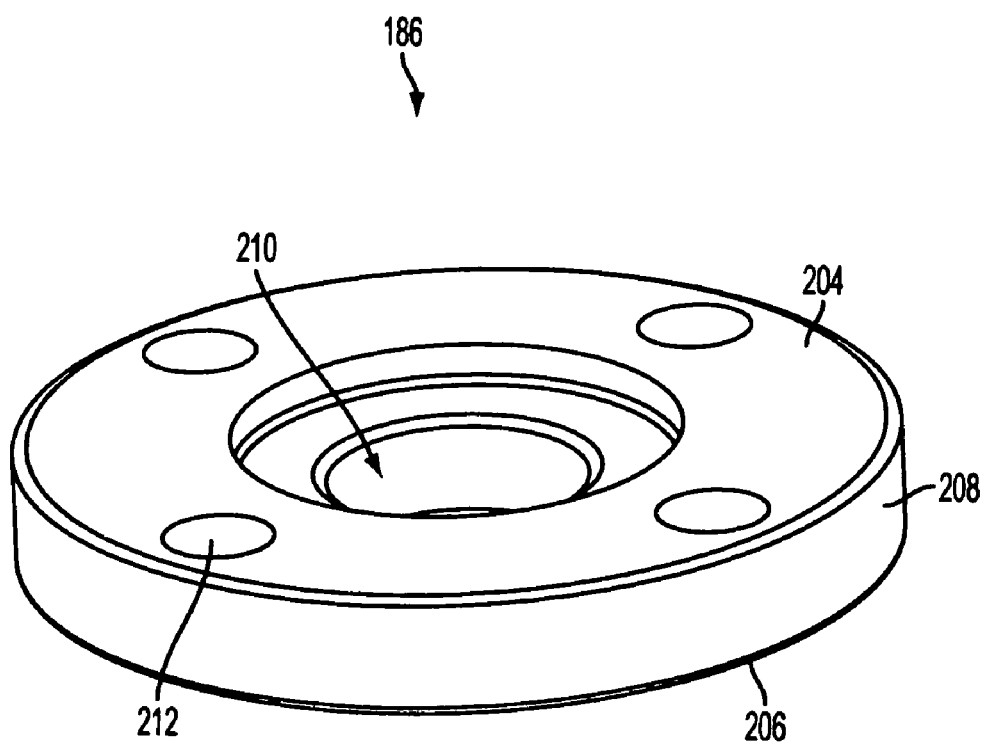
FIG. 35 is a top perspective view of a lower flange from the anti-locking flange assembly.
Figure 36:
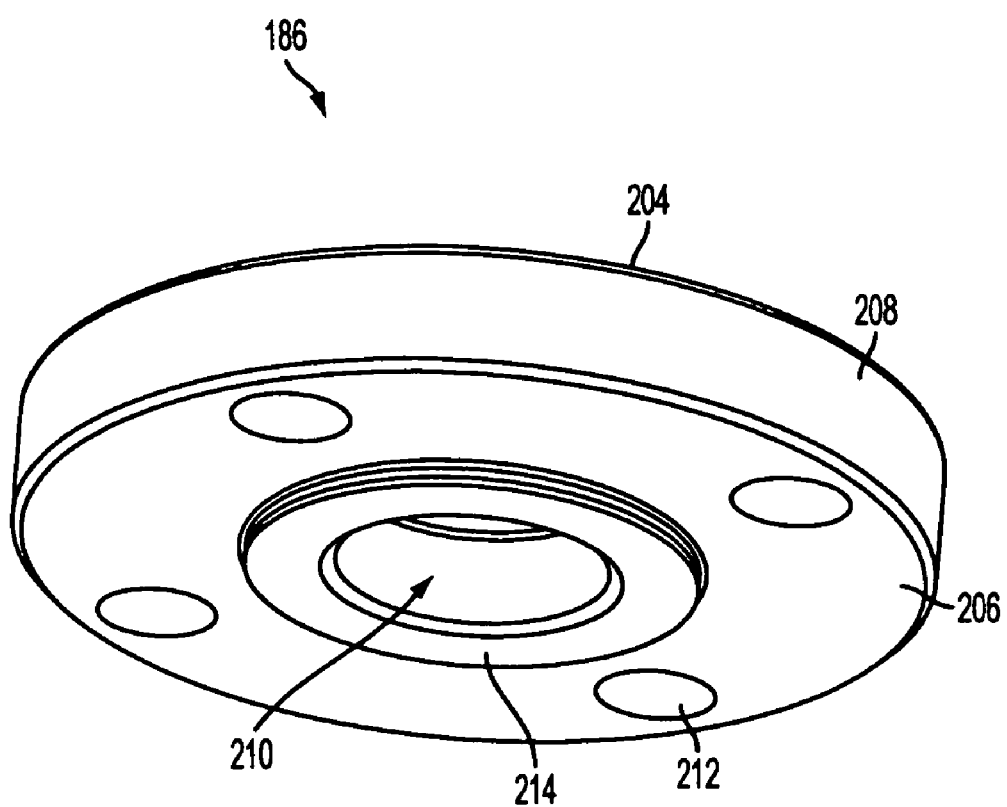
FIG. 36 is a bottom perspective view of the lower flange of the anti-locking flange assembly.

With reference to FIGS. 35 and 36, the lower flange 186 preferably has a first surface 204, a second surface 206 and an outer surface 208. In a preferred embodiment, the outer surface 208 may include texturing, such as knurls, to facilitate the removal of the lower flange 186. The lower flange 186 also preferably has a stepped, annular through-bore 210 for receiving the wheel spindle 34. In a preferred embodiment, at least a portion of the through-bore 210 is threaded for threaded engagement with the threaded portion 184 of wheel spindle 34. With particular reference to FIG. 36, the lower flange 186 may include a collar 214. The collar 214 can be used to assist in centering the grinding wheel 36 on wheel spindle 34. The lower flange 186 may also include tool-engaging structures such as aperture 212 to allow the lower flange 186 to be removed using a tool.

The lower flange 186, in a preferred embodiment, has a generally annular shape. However, in alternate embodiments, the lower flange 186 may have any shape that facilitates its removal by a user. For example, the lower flange 186 may be shaped to include a plurality of sides rather than being annular. In another embodiment, the lower flange 186 may be toroidal with a central diameter that is larger than the diameter near first surface 204 and second surface 206.

Figure 37:
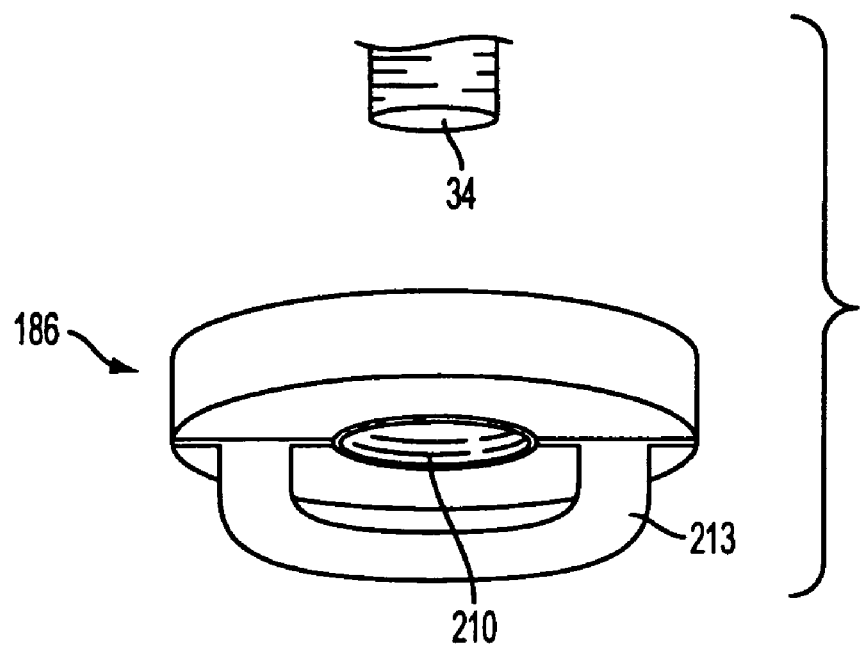
FIG. 37 is a perspective view of an alternative embodiment of a lower flange of the anti-locking flange assembly.
Figure 38:
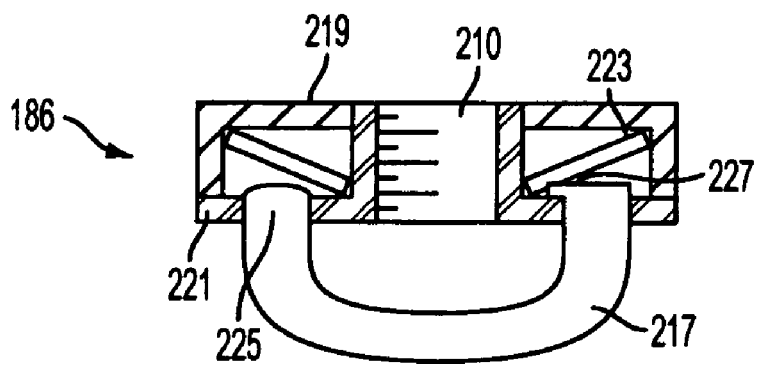
FIG. 38 is a cross-sectional view of the lower flange of FIG. 37.

In an alternative embodiment, rather than have tool-engaging structures used to engage tools for removing the flange 186, lower flange 186 may have a biased lever 213 to assist in the removal of the flange. The user can use the lever 213 to provide the necessary torque to remove the lower flange 186. As can be seen in FIGS. 37 and 38, the lower flange 186 preferably includes a cup portion 219 and a cover portion 221 disposed on the cup portion 219, preferably, forming a toroid. The lower flange 186 also has a stepped, annular through-bore 210 for receiving the wheel spindle 34. In a preferred embodiment, at least a portion of the through-bore 210 is threaded for threaded engagement with the threaded portion 184 of wheel spindle 34.

With particular reference to FIG. 38, a biasing member 223, such as a disc spring, may be disposed within lower flange 186. The biasing member 223 interacts with a leg portion 225 of the lever 217 to keep the lever 217 in one of the following two positions: the first position is an outward position; generally perpendicular to first surface 204 of the lower flange 186, and the second position is a flush position, where the lever 217 is flush with the first surface 204 of the lower flange 186. In a preferred embodiment, the lever 217 may also include pivot protrusion 227 to keep the lever 217 attached to the lower flange 186.

Figure 39:
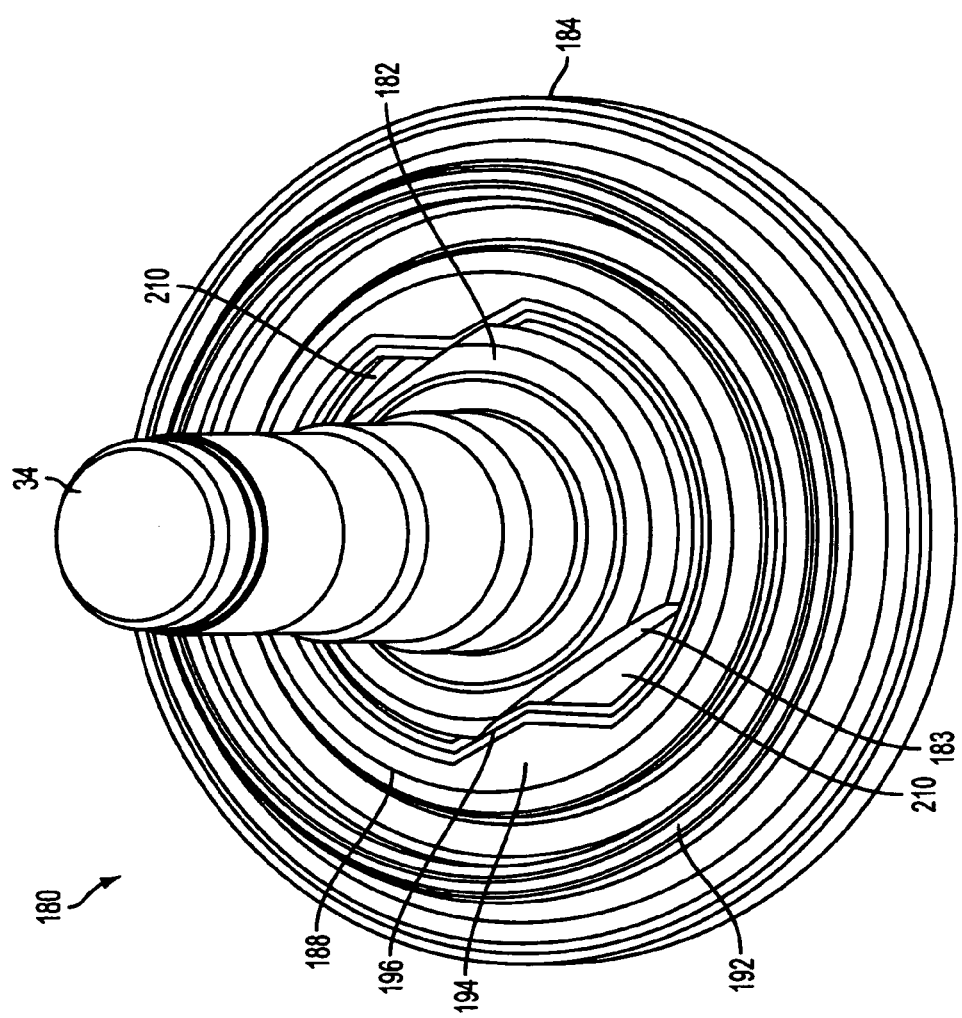
FIG. 39 is a perspective view of the wheel spindle and the upper flange from the anti-locking flange assembly.

As mentioned earlier, the anti-locking flange system 180 is designed to prevent the flanges holding the grinder wheel 36 from over-tightening during operation of the angle grinder 10. With reference to FIG. 39, the wheel spindle 34 is shown slideably received in upper flange 184. As can be seen, in a preferred embodiment, at least a portion of the truncated end 183 of the truncated annular portion 182 of the wheel spindle 34 abuts at least a portion of the engagement end 196 of the protrusion 194, while a portion of the truncated end 183 does not abut anything. This partial abutment allows the upper flange 184 to rotate with respect to the wheel spindle 34 before abutment occurs. The ability of the upper flange 184 to partially rotate with respect to the wheel spindle 34 creates torsional play in the anti-locking flange assembly 180. The torsional play prevents the over-tightening of the assembly by transmitting at least a portion of the torsional loading.

Figure 39A:
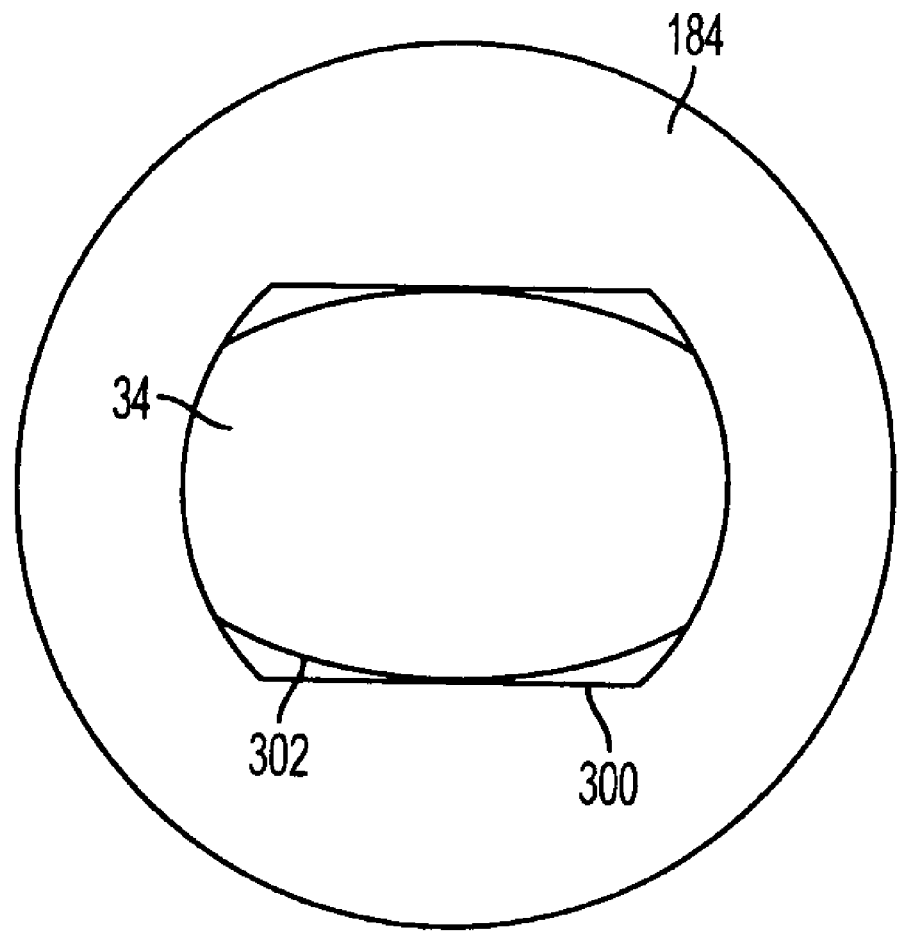
FIG. 39A is a schematic illustration of an alternate embodiment of a spindle and an upper flange of the anti-locking flange assembly.

In an alternate preferred embodiment, as shown in FIG. 39A, rather than having the truncated portions 183 on the wheel spindle 34 and the protrusion 194 on the upper flange 184, the upper flange 184 may have at least one truncated portion 300 and the wheel spindle 34 may have at least one truncated portion having an arcuate protrusion 302. This alternate embodiment also is designed to prevent the flanges holding the grinder wheel 36 from over-tightening during operation of the angle grinder 10.

In an exemplary use, the lower flange 186 is threadingly received on the wheel spindle 34, and, in cooperation with the upper flange 184, is used to hold the grinder wheel 36 in place on the wheel spindle 34. During use of the angle grinder 10, the lower flange 186 may continue to tighten, thereby increasing the load on itself, the grinder wheel 36 and the upper flange 184. When the user then tries to remove the grinder wheel, because of the continued tightening, the user would find removal of the lower flange 186 and consequently the grinder wheel 36 to be very difficult. However, in the present invention, because of the anti-locking flange system 180, the torsional play in the anti-locking flange assembly 180 allows the upper flange 184 and the threadingly attached flange 186 to move several degrees with respect to the wheel spindle 34, decreasing the load on the lower flange 186. This decrease in load results in the reduction of the continued tightening the assembly experiences while the angle grinder 10 is being used, allowing the user to more easily remove the grinder wheel 36.

In an alternative embodiment, anti-locking flange assembly 180 may include an accessory interfacing member (not shown). The accessory interfacing member is preferably disposed between the upper flange 184 and the lower flange 186 and interfaces with an accessory such as the grinder wheel 36. The accessory interfacing member preferably has a threaded through bore for engagement with the wheel spindle 34. In a preferred embodiment, one side of the interface member is flat for increased bearing contact with an accessory that is threadably attachable while the other side of the member has a piloting flange for contact with an accessory that is slideably attachable via a pilot hole. The accessory interfacing member may be made from an elastomeric material for increased compliance or may be made from a more traditional material such as plastic or metal.

Labyrinth Feature in the Gear Case

Figure 40:
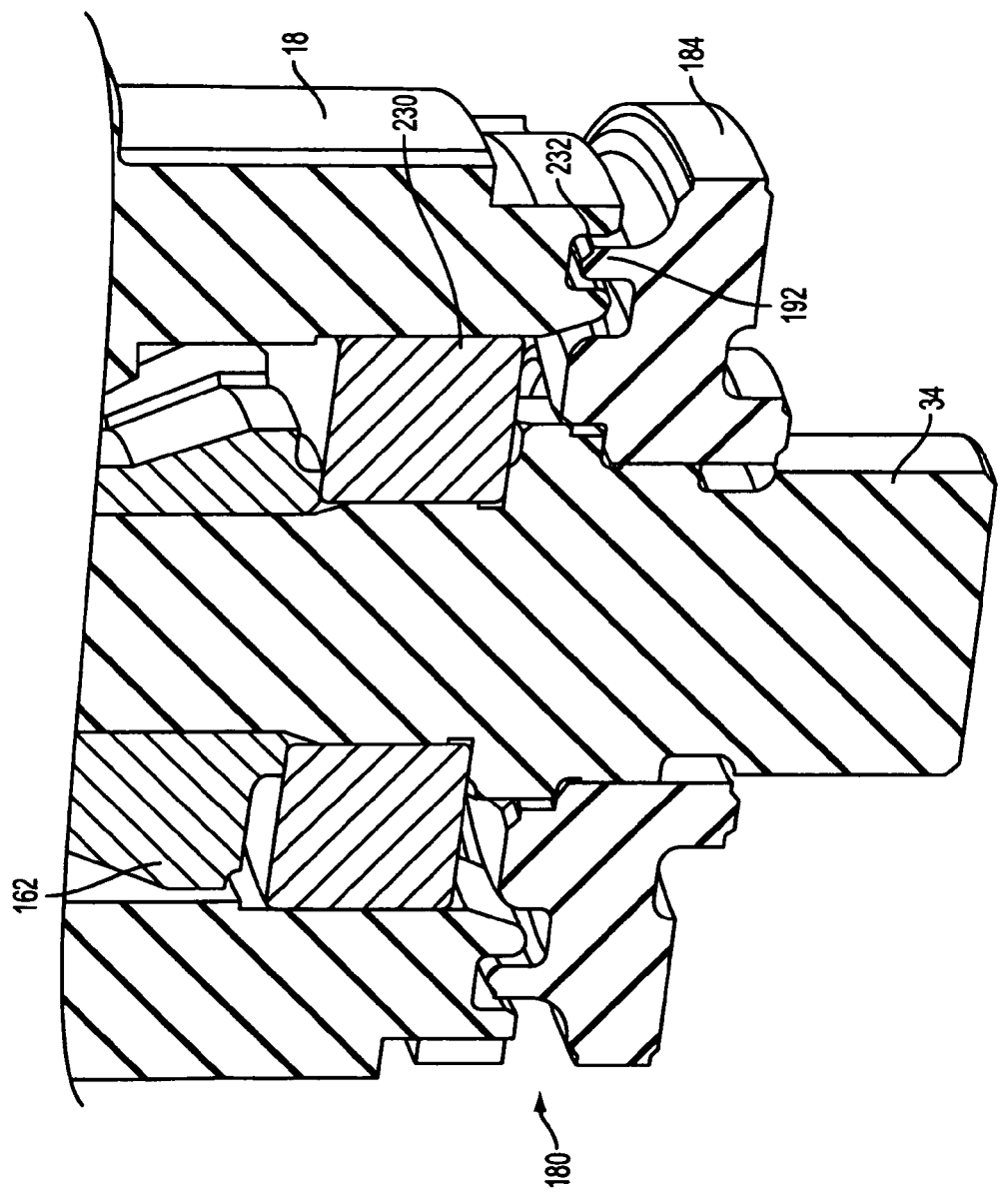
FIG. 40 is a perspective cross-sectional view of a labyrinth feature in the front portion of the angle grinder.

Referring to FIG. 40, the angle grinder 10, in a preferred embodiment, may include a labyrinth feature in the gear case 18 to minimize the dust and debris that may reach the wheel spindle bearing 230. As discussed above, the upper flange 184 includes the second collar 192 which extends into a groove 232 in the gear case 18 forming the labyrinth feature.

Clutch Mechanism

As described earlier, the angle grinder 10 has a grinder wheel 36 that is driven by the motor 28. During operation of the angle grinder 10, on occasion, the grinder wheel 36, while cutting through the desired material, may slow down or get stuck on the material being cut. This results in extra loading on the motor which could result in a shorter life for the motor 28.

Figure 41:
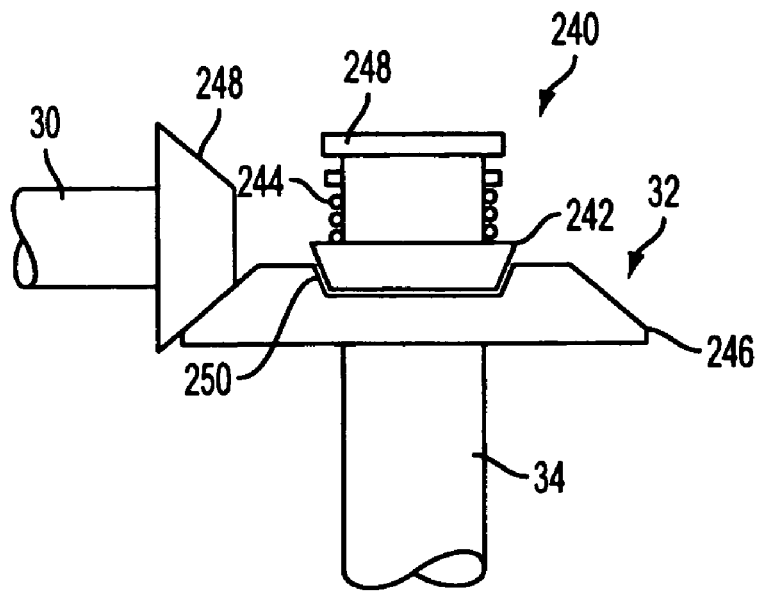
FIG. 41 is a schematic illustration of a clutch mechanism.

In order to alleviate the possible overloading on motor 28, in a preferred embodiment, angle grinder 10 may include a clutch mechanism 240. With reference to FIG. 41, the clutch mechanism 240 is located on the wheel spindle 34 proximate to driving gearset 32 and includes a clutch member 242, a biasing member 244, and wheel spindle gear 246. In a preferred embodiment, a nut member 248 is disposed on the wheel spindle 34 to abut the biasing member 244.

The wheel spindle gear 246, via a through-bore, is rotationally disposed on the wheel spindle 34, so that it can rotate independent of the wheel spindle 34. Preferably, the wheel spindle 34 extends through and beyond the wheel spindle gear 246. In a preferred embodiment, the wheel spindle gear 246 engages with and is driven by motor spindle gear 248. Motor spindle gear 248 is attached to motor spindle 30 which is driven by motor 28.

The wheel spindle gear 246 also includes an aperture having a preferably cone shaped contact surface 250 for engaging the clutch member 242. The clutch 242 is rotationally connected to the wheel spindle 34, so the clutch 242 cannot spin independently of the wheel spindle 34. However, the clutch 242 can slide along the longitudinal axis of the wheel spindle 34. In a preferred embodiment, the biasing member 244 biases the clutch member 242 towards the wheel spindle gear 246. The clutch member 242 is also preferably conically shaped and frictionally engages the conical surface 250 of the wheel spindle gear 246 when biased towards the wheel spindle gear 246. When the clutch member 242 and the wheel spindle gear 246 contact each other, the wheel spindle 34 rotates together with the wheel spindle gear 246.

During use of the angle grinder 10, if the grinder wheel 36, while cutting through the desired material, slows down or gets stuck on the material being cut, the rotational speed difference between the motor spindle 30 and the wheel spindle 34 will result in the frictional force that rotationally holds the clutch 242 together with the wheel spindle gear 246 being overcome and the clutch 242 slipping with respect to the wheel spindle gear 246. As a result, the motor spindle 30 and motor spindle gear 248 can continue rotating at its normal speed while the wheel spindle 34 will stop rotating. This will prevent any overloading on the motor 28.

Figures 42, 43:
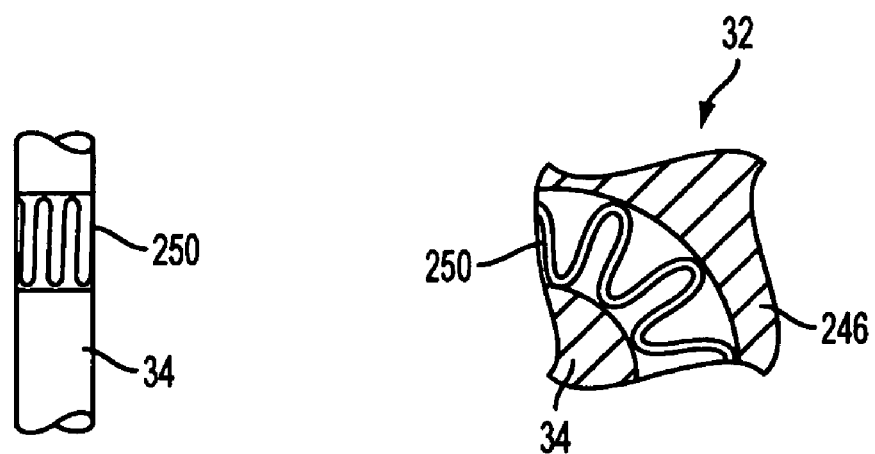
FIG. 42 is a schematic illustration of another clutch mechanism.
FIG. 43 is a partial cross sectional schematic illustration of the clutch mechanism of FIG. 42.

With reference to FIGS. 42 and 43, in an alternative embodiment, instead of using the clutch member 242, a tolerance ring 250 may be used as a clutch mechanism. In a preferred embodiment, the tolerance ring 250 is fixedly attached to the wheel spindle 34 and cannot move independent to the wheel spindle 34. The wheel spindle gear 246 is disposed around the tolerance ring as can be seen in FIG. 43. In a preferred embodiment, the tolerance ring 250 has a generally sinusoidal shape and functions as a biasing member providing an outwardly biasing force frictionally engaging the wheel spindle gear 246.

Functionally, the tolerance ring 250 operates in a similar manner to the clutch member 242, such that if there is a great enough rotational speed difference between the motor spindle 30 and the wheel spindle 34, the frictional force that rotationally holds the tolerance ring 250 together with the wheel spindle gear 246 will be overcome and the tolerance ring 250 will slip with respect to the wheel spindle gear 246 allowing the motor spindle 30 and motor spindle gear 248 to continue rotating at its normal speed while the wheel spindle 34 will stop rotating.

Ergonomic Housing

With reference to FIG. 2, the angle grinder 10, in a preferred embodiment, may also include ergonomic features on the housing 12 of the angle grinder 10. The handle portion 14 of the angle grinder 10 may include an ergonomic saddle feature 15 which is a depression in the housing 12 designed to allow the base of the palm of the user's hand to rest thereon. This allows for a more comfortable grip of the angle grinder 10.

In another preferred embodiment, the angle grinder 10 may also include an arcuate portion 17 on the field case 16. This arcuate portion 17 is curved to match the curve formed by the user's hand when holding the field case 16 of the angle grinder 10. The curve of the arcuate portion 17 on field case 16 provides the user with a better ergonomic fit, thereby reducing the user's hand fatigue.

In yet another preferred embodiment, the angle grinder 10 may also include an arcuate front portion of the gear case 18. This arcuate front portion allows the user to get closer to the workpiece for the cutting, grinding, or sanding of the workpiece.

The description of the invention is merely exemplary in nature and, thus, variations that do not depart from the spirit of the invention are intended to be within the scope of the invention. Such variations are not to be regarded as a departure from the spirit and scope of the invention.

What is claimed is:

1. A particle evacuation system for a power tool comprising:
    a motor disposed within a housing;
    a fan rotatably connected to the motor and driven by the motor;
    a baffle disposed in a handle portion of the housing, radially surrounding at least a portion of the fan, and forming a channel in the baffle; and
    an exhaust channel formed in the housing having a first end and a second end,
    wherein the channel in the baffle is in fluid communication with the first end of the exhaust channel and
    wherein the fan generates an air current to expel any particles located within the housing in a direction away from the motor via the channel formed in the baffle and the exhaust channel formed in the housing.

2. The particle evacuation system of claim 1, wherein the baffle is integrally formed with the housing.

3. The particle evacuation system of claim 1, wherein the size of the exhaust channel increases from the first end to the second end.

4. The particle evacuation system of claim 1, wherein the fan has a plurality of blades that are pitched.

5. The particle evacuation system of claim 1, wherein the fan has a plurality of blades that distally decrease in size.

6. A power tool comprising:
    a housing having a longitudinal axis, a first end and a second end;
    a motor disposed in the housing;
    a working tool wheel driven by the motor and disposed proximate the first end of the housing;
    a first fan disposed in the housing proximate the first end of the housing, the first fan rotatably connected to the motor and driven by the motor, the first fan forcing airflow to move generally linearly along the longitudinal axis;
    a second fan disposed in the housing proximate the second end of the housing, the second fan rotatably connected to the motor and driven by the motor, the second fan forcing airflow to rotate about the longitudinal axis, wherein the motor is disposed between the first and second fans;
    a baffle disposed in a handle portion of the housing, radially surrounding at least a portion of the second fan, and forming a channel in the baffle; and
    an exhaust channel formed proximate the second end of the housing, the exhaust channel having a first end and a second end,
    wherein the channel in the baffle is in fluid communication with the first end of the exhaust channel.

7. The power tool of claim 6, wherein the baffle is integrally formed with the housing.

8. The power tool of claim 6, wherein the size of the exhaust channel increases from the first end to the second end.

9. The power tool of claim 6, wherein the fan has a plurality of blades that are pitched.

10. The power tool of claim 6, wherein the fan has a plurality of blades that distally decrease in size.

11. The power tool of claim 6, wherein the second fan generates an air current to expel any particles located within the housing via the channel formed in the baffle and the exhaust channel formed in the housing.

12. The particle evacuation system of claim 1, wherein the fan generates an air current to expel any particles located within the housing via the channel formed in the baffle and the exhaust channel formed in the housing.

13. An angle grinder comprising:
    a housing having a handle portion, a field case portion and a gear case portion;
    a motor disposed in the field case portion of the housing;
    a gear set disposed in the gear case portion of the housing and operatively connected to the motor via a motor spindle;
    a wheel spindle operatively connected to the gear set;
    a first fan disposed in field case portion of the housing, the first fan rotatably connected to the motor and driven by the motor;
    a second fan disposed in the handle portion of the housing, the second fan rotatably connected to the motor and driven by the motor, wherein the motor is disposed between the first and second fans;
    a baffle disposed in handle portion of the housing, radially surrounding at least a portion of the second fan, and forming a channel in the baffle; and
    an exhaust channel formed in the handle portion of the housing, the exhaust channel having a first end and a second end,
    wherein the channel in the baffle is in fluid communication with the first end of the exhaust channel.

14. The angle grinder of claim 13, wherein the baffle is integrally formed with the housing.

15. The angle grinder of claim 13, wherein the size of the exhaust channel increases from the first end to the second end.

16. The angle grinder of claim 13, wherein the fan has a plurality of blades that are pitched.

17. The angle grinder of claim 13, wherein the fan has a plurality of blades that distally decrease in size.

18. The angle grinder of claim 13, wherein the second fan generates an air current to expel any particles located within the housing via the channel formed in the baffle and the exhaust channel formed in the housing.

* * * * *